(12) United States Patent
Gillet et al.

(10) Patent No.: US 10,650,205 B2
(45) Date of Patent: May 12, 2020

(54) METHODS, SYSTEMS, AND APPARATUSES FOR SCANNING AND DECODING DIRECT PART MARKING INDICIA

(71) Applicant: Hand Held Products, Inc., Fort Mill, SC (US)

(72) Inventors: Alain Gillet, Galan (FR); Jean-Luc Basso, Montbrun-lauragais (FR)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 16/146,462

(22) Filed: Sep. 28, 2018

(65) Prior Publication Data
US 2020/0104556 A1    Apr. 2, 2020

(51) Int. Cl.
*G06K 7/10* (2006.01)
*G02B 27/10* (2006.01)

(52) U.S. Cl.
CPC ....... *G06K 7/10831* (2013.01); *G02B 27/106* (2013.01); *G06K 7/10742* (2013.01); *G06K 7/10861* (2013.01); *G06K 2007/10524* (2013.01)

(58) Field of Classification Search
CPC ........... G06K 7/10831; G06K 7/10742; G06K 7/10861; G06K 2007/10524; G02B 27/106
See application file for complete search history.

(56) References Cited

U.S. PATENT DOCUMENTS

| | | | |
|---|---|---|---|
| 5,942,762 A | 8/1999 | Hecht | |
| 6,429,934 B1 | 8/2002 | Dunn et al. | |
| 6,661,521 B1 * | 12/2003 | Stern | G06K 7/10732 235/462.42 |
| 7,399,647 B2 | 7/2008 | Reinhorn | |
| 8,061,610 B2 | 11/2011 | Nunnick | |
| 8,107,808 B2 | 1/2012 | Messina et al. | |
| 9,411,999 B2 * | 8/2016 | Lei | G06K 7/10792 |
| 9,536,124 B1 * | 1/2017 | Nunnink | G06K 7/10831 |
| 2006/0131419 A1 | 6/2006 | O'Dea et al. | |
| 2006/0138234 A1 | 6/2006 | Joseph et al. | |

* cited by examiner

*Primary Examiner* — Seung H Lee
(74) *Attorney, Agent, or Firm* — Alston & Bird LLP

(57) ABSTRACT

Various embodiments described herein relates to indicia reading system for scanning and decoding direct part markings (DPM) indicia. The indicia reading system includes a plurality of collimating optical elements that generate collimated light beams. A plurality of diffractive optical elements is tuned to split a corresponding collimated light beam into at least two sets of refracted light beams at two incident angles relative to a DPM indicia. A first set of refracted light beams with a zero-diffraction order and a first incident angle causes a bright-field illumination in a far-field area. A second set of refracted light beams with a first-diffraction order and a second incident angle causes a dark-field illumination in a near-field area. An image sensor generates image data of the DPM indicia based on a set of reflected light beams received from the DPM indicia in accordance with one of the bright-field illumination or the dark-field illumination.

20 Claims, 11 Drawing Sheets

METHODS, SYSTEMS, AND APPARATUSES FOR SCANNING AND DECODING DIRECT PART MARKING INDICIA

TECHNOLOGICAL FIELD

Exemplary embodiments of the present disclosure relate generally to a scanning and decoding system for scanning coded information and, more particularly, to methods, systems, and apparatuses for scanning and decoding coded information.

BACKGROUND

Numeric codes, per various known standards, such as Universal Product Codes (UPC), are marked in form of indicia either indirectly or directly on a part or a component of a product for various applications, such as product identification and inventory management. Indirect marking includes a temporary marking of the indicia, for example, printed labels or barcodes, that is printed on a print media and pasted on a surface of the product by use of an adhesive. Direct part marking (DPM) includes a permanent marking of the indicia on workpieces using various methods, depending upon the material composition, part application, and environmental conditions. Common methods for marking DPM targets include, but are not limited to, dot peening, laser, and electro-chemical etch.

Applicant has identified several deficiencies and problems associated with conventional methods of scanning and decoding DPM indicia. Through applied effort, ingenuity, and innovation, many of these identified problems have been solved by developing solutions that are included in embodiments of the present disclosure, many examples of which are described in detail herein.

SUMMARY

An indicia reading system includes a plurality of collimating optical elements positioned at a plurality of locations on a boundary frame around an objective lens of the indicia reading system. Each of the plurality of collimating optical elements is configured to generate a collimated light beam. A plurality of diffractive optical elements may be coupled with the plurality of collimating optical elements. Each of the plurality of diffractive optical elements is tuned to split a corresponding collimated light beam into at least two sets of refracted light beams at two incident angles relative to a DPM indicia, in accordance with two diffraction orders. A first set of refracted light beams with a zero-diffraction order and a first incident angle may cause a bright-field illumination in a far-field area. A second set of refracted light beams with a first-diffraction order and a second incident angle may cause a dark-field illumination in a near-field area. An image sensor is configured to generate image data of the DPM indicia based on a set of reflected light beams received from the DPM indicia in accordance with one of the bright-field illumination or the dark-field illumination performed on the DPM indicia.

In an embodiment, an image processing module that is coupled to the image sensor is configured to reconstruct a first image based on the generated image data in an instance in which the image sensor is a monochrome sensor. The monochrome sensor is configured to receive the set of reflected light beams from the DPM indicia, wherein the set of reflected light beams corresponds to one of the at least two sets of refracted light beams. A decoder module is configured to decode the reconstructed first image when the contrast level of the reconstructed first image exceeds a threshold contrast level.

In an embodiment, the image processing module is configured to reconstruct a second image based on the generated image data in an instance in which the image sensor is a color sensor. The color sensor is configured to receive a portion of the set of reflected light beams from the DPM indicia, wherein the set of reflected light beams comprises a plurality of color components and corresponds to one of the at least two sets of refracted light beams.

Each of the at least two sets of refracted light beams include a plurality of color components, wherein a color incident angle of each color component of the plurality of color components in each of the at least two refracted light beams on the DPM indicia is based on a wavelength of corresponding color component. In an embodiment, the image processing module may be configured to reconstruct a binary image based on the generated image data in an instance in which the image sensor is a color sensor.

The image processing module is configured to reset a pixel value to a specific value for the reconstruction of the binary image based on a defined criterion when one or more characteristics of the set of reflected light beams do not satisfy first threshold values, wherein the reconstructed binary image is a black and white image. In an example embodiment, the defined criteria may correspond to a comparison of an average pixel value with a threshold value, wherein for each pixel, if corresponding pixel value is less than the threshold value, the corresponding pixel value is reset to zero, and if corresponding pixel value is greater than the threshold value, the corresponding pixel value is reset to 1.

The image processing module is further configured to generate a plurality of color planes when one or more characteristics of the set of reflected light beams satisfy first threshold values. The image processing module is further configured to select a color plane from the plurality of color planes for the reconstruction of the second image based on a distance between the image sensor and the DPM indicia when one or more characteristics of the plurality of color planes satisfy second threshold values, wherein one or more characteristics of the selected color plane is the highest relative to one or more characteristics of other color planes. The image processing module is further configured to determine a color of each pixel based on a combination of the plurality of color components for the reconstruction of the second image when one or more characteristics of the plurality of color planes do not satisfy second threshold values.

The image processing module is further configured to remove noise color component from the reconstructed second image. A decoder module is configured to decode the reconstructed second image when a contrast level of the reconstructed second image exceeds a threshold contrast level. The image processing module is further configured to cause the reconstructed second image to be displayed on a display screen in an instance when the decoding of the reconstructed second image is successful.

In an embodiment, a plurality of diffuser elements coupled with the plurality of diffractive optical elements, wherein each diffuser element is configured to scatter each of the at least two sets of refracted light beams received from corresponding diffractive optical elements at defined angles. The image processing module is further configured to control a plurality of diffuser elements coupled with the one or more of the plurality of diffractive optical elements based on a readability index of the DPM indicia from a first image or a second image reconstructed by the image processing module.

In an embodiment, each of the plurality of diffractive optical elements corresponds to a transmissive diffraction grating element. In an embodiment, the indicia reading system is a DPM indicia reading system.

In another aspect of the present disclosure, a method for reading indicia is disclosed herein. The method may include generating, by a plurality of collimating optical elements, collimated light beams based on light beams received from a plurality of light sources at different wavelengths. The method may further include splitting, by a diffractive optical element of a plurality of diffractive optical elements, a collimated light beam generated by one of the plurality of collimating optical elements into at least two sets of refracted light beams at two incident angles relative to a DPM indicia, in accordance with two diffraction orders. The method may further include operating, by a DPM illumination system, an indicia reading system in a bright-field illumination mode in a far-field area based on a first set of refracted light beams with a zero-diffraction order and a first incident angle relative to the DPM indicia. The method may further include operating, by the DPM illumination system, the indicia reading system in a dark-field illumination mode in a near-field area based on a second set of refracted light beams with a first-diffraction order and a second incident angle relative to the DPM indicia. The method may further include generating, by an image sensor, image data of the DPM indicia based on a set of reflected light beams received from the DPM indicia in accordance with the operation of the indicia reading system in the bright-field illumination mode and/or the dark-field illumination mode.

The method may further include reconstructing, by an image processing module, one of a first image, a binary image, or a second image based on the generated image data and a type of the image sensor, wherein the type of the image sensor corresponds to a monochrome sensor or a color sensor. The method may further include receiving, by the monochrome sensor, the set of reflected light beams from the DPM indicia, wherein the set of reflected light beams corresponds to one of the at least two sets of refracted light beams.

In an embodiment, the method may include reconstructing, by the image processing module, a binary image based on the generated image data in an instance in which the image sensor is a color sensor. In such an embodiment, the image processing module resets a pixel value to a specific value for the reconstruction of the binary image based on a defined criterion when one or more characteristics of the set of reflected light beams do not satisfy first threshold values, wherein the reconstructed binary image is a black and white image.

In another embodiment, the method may include generating, by the image processing module, a plurality of color planes when one or more characteristics of the set of reflected light beams satisfy first threshold values. A color plane may be selected from the plurality of color planes for the reconstruction of the second image based on a distance between the image sensor and the DPM indicia when one or more characteristics of the plurality of color planes satisfy second threshold values, wherein one or more characteristics of the selected color plane is the highest relative to one or more characteristics of other color planes.

In an embodiment, the method may include determining, by the image processing module, a color of each pixel based on a combination of the plurality of color components for the reconstruction of the second image when one or more characteristics of the plurality of color planes do not satisfy second threshold values. Noise color component may be removed from the reconstructed second image. In an embodiment, the method may include decoding, by a decoder module, the reconstructed first image, binary image, or the second image when the contrast levels of the reconstructed first image, binary image, or the second image exceed a threshold contrast level.

The method may further include causing, by the image processing module, the reconstructed first image, binary image, or the second image to be displayed on a display screen in an instance when the decoding of the reconstructed first image, binary image, or the second image is successful.

In an embodiment, the method may include scattering, by a plurality of diffuser elements coupled with the plurality of diffractive optical elements, each of the at least two sets of refracted light beams received from corresponding diffractive optical elements at defined angles. The image processing module may control the plurality of diffuser elements coupled with the plurality of diffractive optical elements based on a readability index of the DPM indicia from a first image, a binary image or a second image reconstructed by the image processing module. In an embodiment, each of the plurality of light sources may correspond to a broadband light source or a multi-color light source. The light beams with different wavelengths, generated by the plurality of light sources, may comprise a plurality of rays having different angles of incidence on the DPM indicia in an instance in which the indicia reading system operates in the dark-field illumination mode.

The above summary is provided merely for purposes of providing an overview of one or more exemplary embodiments described herein to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
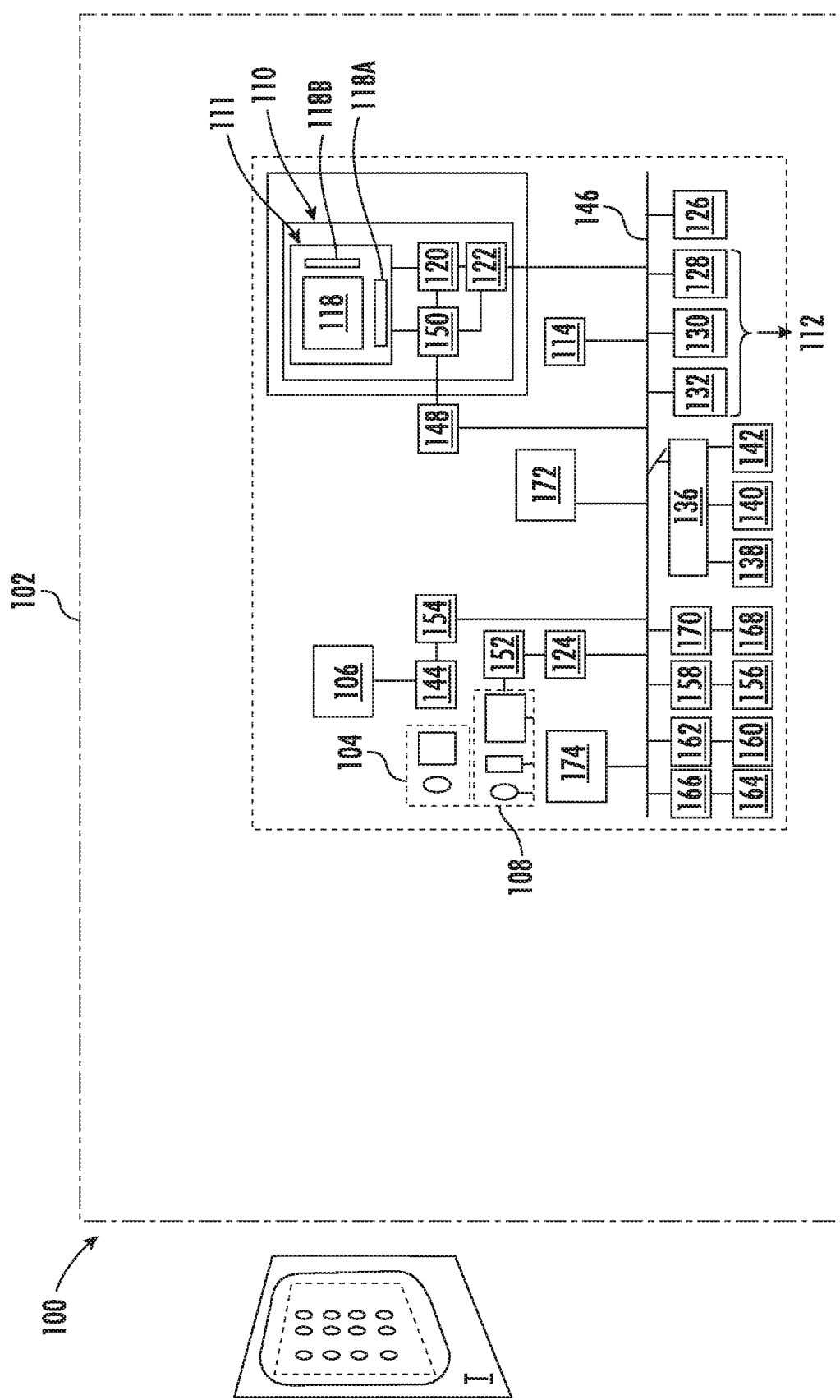
FIG. 1 is a block diagram illustrating various hardware components of an indicia reading system, in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment)

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

DPM allows workpieces to be directly marked, identified and traced to their origin, and is prevalent in various sectors, such as automotive, aerospace, electronics, medical equipment, tooling, and metalworking industries, among many others. A machine-readable, high-density, two-dimensional, data matrix-type (or QR), optical code/symbols or DPM target is comprised of multiple elements that are directly marked on a surface (e.g. surface of materials such as metal, rubber, glass, etc.). For making the DPM indicia on the surface, there are many marking technologies to choose from (e.g. mechanical drilling/hammering/laser etching/ chemical etching/sand-blasting/mold casting/stenciling etc.) depending on a type of surface, cost, and level of durability that may be desired.

Unlike paper-based barcodes (i.e. printed on plain paper and usually printed with black ink/thermal on white backgrounds), DPM indicia present additional example challenges that include, but are not limited to, reflectance in form of specular reflection from the surface and lack of contrast between actual indicia, and the surface. In some examples, markings and/or embodiments can appear completely "washed-out" to an observer and/or to an imager of the indicia reading apparatus. Thus, for decoding example DPM indicia, indicia reading apparatuses, particularly mobile imaging scanners, historically had low performance. In some examples, low or otherwise poor performance could be linked to an illumination source being proximate to an imaging lens, which, in some examples, caused a specular reflection that contaminated a captured image.

Various types of illumination, such as bright-field illumination and dark-field illumination, are often used to read such marked indicia. In bright-field illumination, high-angle illumination strikes the indicia on the surface nearly perpendicularly, or at an angle not greater than 45 degrees from perpendicular relative to the surface that includes the DPM indicia. Thus, substantial illumination reflects toward the indicia reading apparatus causing, in some examples, a resultant captured image with low contrast and specular reflection.

In some examples, to suppress the undesired reflection, the orientation of the indicia and/or the indicia reading apparatus needs to be changed. However, it may not be user friendly and/or may be difficult to determine an orientation that addresses the aforementioned problems. Indeed, in some cases where the indicia are etched or peened onto the surface of part or component of the product and/or the surface is rough or irregular, high-angle bright-field illumination may further hinder the capture of an image as the irregular surface may scatter as much light back to the indicia reading apparatus as the surface of the background, resulting in indistinguishable features in the image.

On the other hand, in dark-field illumination, low angle illumination strikes the indicia at a low angle from the surface of the product, i.e., at an angle between 45 degrees and 90 degrees from perpendicular relative to the surface that includes the DPM indicia. Such dark-field illumination reflects away from the indicia reading apparatus, with only random, irregular features of the indicia on the surface of the object reflecting a portion of the illumination back into the indicia reading apparatus. Indeed, compounding the aforementioned problems, dark-field illumination requires long and inefficient light pipes for deviating the light at a specific angle.

Described herein are systems, methods, and DPM indicia reading apparatuses that provide compact and simple indicia reading technique that relies on, in some examples, transmissive diffraction grating optical components that are configured to generate dark-field and far-field illumination simultaneously to enable a high contrast image of the indicia is reconstructed. Also, in some examples, the systems, methods, and apparatuses disclosed herein may provide an ability to choose angle of incidence from various possible angles corresponding to the color components of collimated light by selecting a specific color plane or a combination of the three-color planes. In further examples, the disclosed apparatus may be embodied by a compact form factor as the light may be collimated, ins some examples, based on simple collimated apparatuses.

The term "dark-field illumination" refers to a process of illumination of a DPM indicia in which light beams strike the indicia at a low angle on the surface (that includes the DPM indicia) of the product. The low angle may be an angle between 45 degrees and 90 degrees from perpendicular relative to the surface that includes the DPM indicia. Such dark-field illumination reflects away from the indicia reading apparatus, with only random, irregular features of the indicia on the surface of an object reflecting a portion of the illumination back into the indicia reading apparatus.

The term "bright-field illumination" refers to a process of illumination of the DPM indicia in which light beams strike the indicia at a high angle on the surface (that includes the DPM indicia) of the product. The high angle may be nearly perpendicular, or at an angle not greater than 45 degrees from perpendicular relative to the surface that includes the DPM indicia. Thus, substantial illumination reflects back toward the indicia reading apparatus causing, in some examples, a resultant captured image with low contrast and high specular reflection.

The term "near-field" refers to a range in which the dark-field illumination is performed to prevent specular reflection. Indicia reading apparatuses scanners may be able to read a DPM indicia in the near-field at a distance less than about three feet away.

The term "far-field" refers to refers to a range in which the bright-field illumination is performed. Indicia reading apparatuses scanners may be able to read a DPM indicia in the far-field at a distance more than three feet away.

FIG. 1 is a block diagram illustrating various hardware components of an indicia reading system 100 in accordance with some example embodiments described herein. As illustrated, the indicia reading system 100 may include indicia reading apparatus 102 on a surface of a workpiece target T. The indicia reading apparatus 102 may include various assemblies and modules configured to operate in one or both of a dark-field illumination mode and/or a bright-field illumination mode. In accordance with various embodiments described herein, the indicia reading apparatus 102 may be operable for reading decodable indicia including, but not limited to, a DPM indicia marked on the surface, e.g., a metal surface, of the workpiece target T. While single decodable indicium is illustrated as being read at a time, per other embodiments, it will be appreciated that an image may be operable to capture one or more decodable indicia on a single object or on a plurality of objects at same time.

The following description uses nomenclature associated with indicia reading apparatuses, such as indicia reading apparatus 102, and may generally include hand held indicia reading devices, fixed indicia reading devices, however those of ordinary skill in the art will recognize that aspects of the present disclosure may also be incorporated in other electronic devices having an image capturing and/or indicia reading capability which may be configured as, for example, mobile phones, cell phones, satellite phones, smart phones, telemetric devices, personal data assistants, cameras, sleds for attachment onto other devices, and other devices.

The surface of the workpiece target T may be directly marked using different techniques, such as, but not limited to, imprinting, etching, molding, or dot-peening techniques. For example, in an embodiment, the surface of the workpiece target T, such as a metal workpiece, may advantageously be dot-peened with sunken indicia that present as hemispherical depressions that are located below or behind the workpiece target T surface. In another embodiment, the surface of the workpiece target T, such as a plastic workpiece, may advantageously be molded with raised indicia, such as hemispherical bumps, that are located above or in front of the workpiece target T surface. In yet another embodiment, the surface of the workpiece target T may be advantageously etched with, for example, a laser, to form indicia of different light reflectivity closely adjacent to the surface of the workpiece target T. Other shapes for the indicia, and marking techniques, other than laser-etching, are also contemplated by this disclosure.

The elements may be arranged in a two-dimensional matrix-type array, or may be linearly arranged as a character string. In practice, the raised or sunken indicia are located at an elevation (height or depth) that is about one millimeter or less away from the target surface, while the etched elements are generally flush with the target surface of the workpiece target T.

In accordance with various embodiments of the present disclosure, the indicia reading apparatus 102 may include a DPM illumination system 104 that may be adapted to illuminate decodable indicia, like a DPM indicia, located on the workpiece target T. The indicia reading apparatus 102 may further include a plurality of light sources 106, an aiming system 108, an imaging system 110 (including an image sensor 111), and various other components, such as a memory 112, an image processing module 114, various interface units, and other such units, as described herein forth.

In an example embodiment, the DPM illumination system 104 may comprise various optical elements, circuitries, and/or logic configured to illuminate the surface, which may include a 1D or 2D DPM bar code symbol, of workpiece target T. In various embodiments, the DPM illumination system 104 may operate in one of the dark-field illumination mode and/or the bright-field illumination mode. In an embodiment, the DPM illumination system 104 may be controlled by use of an illumination control unit 144 that may be further coupled to a system bus 146, via an interface circuit 154.

In an embodiment, the DPM illumination system 104 may be mechanically coupled with a plurality of light sources 106 within the indicia reading apparatus 102 as illustrated in FIGS. 2A-2I.

The plurality of light sources 106 may be used to illuminate the DPM indicia under dark-field illumination and/or bright-field illumination mode. In an embodiment, the plurality of light sources 106 may be packaged in a specified layout onto thermally efficient tiles that provide high power density and efficient light-emitting arrays. Various exemplary layouts are described with respect to the description of FIG. 2J-2L.

The aiming system 108 may comprise various optical elements, circuitries, and/or logic configured to be operative for projecting an aiming pattern onto the workpiece target T. The aiming system 108 further includes an aiming pattern light source bank and associated light shaping optics for generating an aiming pattern on the workpiece target T. The aiming system 108 may be controlled with use of an aiming control circuit 152 that may be further coupled to the system bus 146, via an interface circuit 124.

The imaging system 110 may include an image sensor 111 that further comprises an image sensor array 118 having pixels arranged in rows and columns, with associated column circuitry 118B and row circuitry 118A. The image sensor 111, such as a 1D or 2D CCD, CMOS, NMOS, PMOS, CID or CMD solid state image sensor, together with an imaging optics assembly, may be configured for receiving and focusing an image of the workpiece target T onto the image sensor array 118. In various embodiments, the array-based imaging assembly may be replaced by a laser array or laser scanning based imaging assembly comprising a laser source, a scanning mechanism, emit and receive optics, a photodetector, and accompanying signal processing circuitry.

Associated with the image sensor 111 may be an amplifier 120, and an analog to digital converter 122 which converts image information in the form of analog signals (read out of image sensor 111) into image information in the form of digital signals. The image sensor 111 may also have an associated timing and control circuit 150 for use in controlling, for example the exposure period of the image sensor 111 and gain applied to the amplifier 120. The noted circuit components, such as the image sensor 111, the amplifier 120, the analog to digital converter 122, and the timing and control circuit 150 may be packaged into a common image sensor integrated circuit, that may correspond to the imaging system 110. In one example, the image sensor integrated circuit may incorporate a Bayer pattern filter, so that defined at the image sensor 111 are red pixels at red pixel positions, green pixels at green pixel positions, and blue pixels at blue pixel positions. Frames that are provided utilizing such an image sensor 111 incorporating the Bayer pattern may include red pixel values at red pixel positions, green pixel values at green pixel positions, and blue pixel values at blue pixel positions. The indicia reading apparatus 102 may further include an interface circuit 148 for coupling the image sensor 111 and a timing and control circuit 150 to the system bus 146.

The memory 112 may be in communication with the image sensor 111 and may be configured to store frames of image data representing light incident on the image sensor 111. Also, as illustrated in FIG. 1, in accordance with various embodiments, the memory 112 may be in communication with the image processing module 114, a central processing unit (not shown), and a decoder module 172 that includes instructions to be executed by the image processing module 114 to decode one or more indicia, for instance, the DPM indicia represented in at least one of the frames of image data. The memory 112 may include RAM 128, a nonvolatile memory, such as EPROM 130, and a storage memory device 132, such as a flash memory device or a hard drive memory device.

The image processing module 114 may include suitable logic, circuitry, and/or instruction set that may be configured to read out image data stored in the memory 112 and subject such image data to various image processing algorithms. The image processing module 114 is a programmable control device which may be configured to receive, output and process image data in accordance with a stored program stored in either of or both the RAM 128 and the EPROM 130. The image processing module 114 is connected to the system bus 146 through which program data and working data, including address data, may be received and transmitted in either direction to any circuitry that is also connected thereto.

In an embodiment, the image processing module 114 may be a general purpose, off-the-shelf VLSI integrated circuit microprocessor which has overall control of the circuitry of FIG. 1, but which devotes most of its time to decoding image data stored in RAM 128 in accordance with program data stored in EPROM 130. In an alternative or additional embodiment, the image processing module 114 may be a special purpose VLSI integrated circuit, such as a programmable logic or gate array, which is programmed to devote its time to functions, in addition to decoding the image data.

The image processing module 114 may be configured to perform the tasks of decoding the image data, once such data has been stored in RAM 128, handling the menu-related options and reprogramming functions, and providing overall system level coordination. The image processing module 114 may be further configured to control the image acquisition process, the analog to digital (A/D) conversion process and the storage of image data, including the ability to access the memory 112. The image processing module 114 may also perform many timing and communication operations, for example, control the illumination of the plurality of light sources 106, various interface units coupled with various hardware, such as a timing and control circuit 150, an analog to digital converter 122, the transmission and reception of image data to and from a processor external to the indicia reading apparatus 102, through an RS-232 (or other compatible device), and the outputting of user perceptible data, via an output device 174, such as a beeper, a good read LED and/or a display which may be, for example, a liquid crystal display.

In an example embodiment that incorporates a Bayer pattern on the image sensor 111, the image processing module 114, prior to subjecting a frame to further processing, may be configured to interpolate pixel values at frame pixel positions intermediate of green pixel positions utilizing green pixel values. In another embodiment, the image processing module 114, prior to subjecting a frame for further processing, may interpolate pixel values intermediate of red pixel positions utilizing red pixel values. In another embodiment, the image processing module 114, prior to subjecting a frame for further processing, may interpolate pixel values intermediate of blue pixel positions utilizing blue pixel values. In yet another embodiment, the image processing module 114, prior to subjecting a frame for further processing, may interpolate all pixel values, thus utilizing all pixel values, and generating a colored image. The image processing module 114 may be further configured to remove noise pixel values from the generated colored image. The indicia reading apparatus 102 may further include a direct memory access (DMA) unit 126 for routing image information, read out from the imaging system 110, that has been subject to conversion to the RAM 128. In another embodiment, the indicia reading apparatus 102 may deploy the system bus 146 (e.g., a PCI bus) for providing bus arbitration mechanism, thus eliminating the need for a central DMA controller.

The actual division of operations between the image processing module 114 and additional processors, such as an ASIC (not shown) may depend on the type of off-the-shelf microprocessors that are available, the type of image sensor which is used, the rate at which image data is output by the imaging system 110, and the like. It should be, however understood that neither the number of processors used, nor the division of operations therebetween, is of any fundamental significance for purposes of the present disclosure.

The indicia reading apparatus 102 may further include a power supply 136 that supplies power to a power grid (not shown) to which all the electrical components of the indicia reading apparatus 102 may be connected. The power supply 136 may be coupled to various power sources, e.g., a battery 138, a serial interface 140 (e.g., USB, RS232), and/or AC/DC transformer 142. The indicia reading apparatus 102 may further include a power input unit (not shown) including a charging capacitor that is continually charged by the power supply 136. In this aspect, the power input unit may be configured to output energy within a range of energization levels associated with illumination exposure periods of the DPM illumination system 104.

The indicia reading apparatus 102 may further include a display 156 coupled to the system bus 146 and in communication with the image processing module 114, via an interface unit 158. A pointer mechanism 160 may communicate with the image processing module 114, via an interface unit 162 connected to the system bus 146. Further, an input device 164, such as a keyboard, may be coupled to the systems bus 146 and in communication with the image processing module 114, via an interface unit 166. The indicia reading apparatus 102 may also include a range detector unit 168 coupled to the system bus 146, via an interface unit 170. In one embodiment, the range detector unit 168 may be an acoustic range detector unit. In an embodiment, various interface circuits may share circuit components. For example, a common microcontroller providing control inputs to an interface circuit (not shown) and to the power input unit (not shown) may be provided to coordinate timing between image sensor array controls and illumination system controls.

In an embodiment, the indicia reading apparatus 102 may include several peripheral components including, but not limited to, a trigger as the input device 164, that may be used to activate a trigger signal for enabling frame readout and/or certain decoding processes. Specifically, the indicia reading apparatus 102 may be operative so that in response to the activation of the trigger signal, a succession of frames may be captured by way of reading out of image information from the image sensor 111 (typically in the form of analog signals) and then storage of the image information after conversion into the memory 112 (which can buffer one or more of the succession of frames at a given time). In this regard, the image processing module 114 may be operative to subject one or more of the succession of frames to a decode attempt.

In a specific example, the image processing module 114 may be configured for anti-counterfeiting by recognizing object texture and/or specific tags, including but not limited to, random indentions/protrusions (like Bubble Tag™), random microchips of metal embedded in a polymer, stereo views of security holograms (which will look different from differing angles of the stereoscopy imagery), the like, etc.

In operation and in response to the activation of the trigger signal, the indicia reading apparatus 102 may be operative in the dark-field illumination mode and/or the bright field illumination mode. The activation of the trigger signal may be in response to an actuation of a trigger, such as the triggers 202A, 202B, or 202C, (shown in FIGS. 2A-I) which are manual triggers operated by the user. Alternatively, an automatic trigger may be actuated based on the presence of DPM indicia in vicinity of the indicia reading apparatus 102. The image processing module 114, coupled to the trigger, may output a scan enable signal responsive to the trigger. Accordingly, control signals are output on another line to control a clock generator which in turn provides suitable enabling signals for the DPM illumination system 104 and clock signals for imaging system 110, as required for the proper operation thereof. The clock generator may also be arranged to generate a scan interrupt (or end of scan) signal which is applied as an input to an interface unit via a conductor to provide the image processing module 114 with information that indicates the times at which each block of scan data ends.

Thus, the DPM illumination system 104 produces light beams that strike the workpiece target T on which indicia, such as 1D or 2D bar code symbols or OCR characters, is located. These light beams are reflected from the surface of the workpiece target T, and the reflected beams are projected onto the image sensor 111, such as a CCD and/or CMOS type image sensor having a pixel array. Analog signals developed by the image sensor 111, in response to light incident thereon (corresponding to the reflected beams), are received and processed by a signal processing circuit (not shown) in the imaging system 110. The amplifier 120 may amplify the gain of the image information and the analog to digital converter 122 converts the image information in the form of analog signals, read out of image sensor 111 into image information in the form of digital signals, thereby producing a digitized image.

The decoder module 172, together with a DMA controller, thereafter decodes the image data produced, in accordance with a program stored in the EPROM 130. The DMA controller assists the decoder module 172 to direct the image data through the system bus 146 to the RAM 128. The DMA controller may also include circuitry that may be configured to perform a variety of other support functions for the decoder module 172, so that the decoder module 172 can perform decoding activities and thereby increase the data throughput rate for the indicia reading apparatus 102. If desired, such functions may be integrated into a single application specific integrated circuit (ASIC).

Figure 2A:
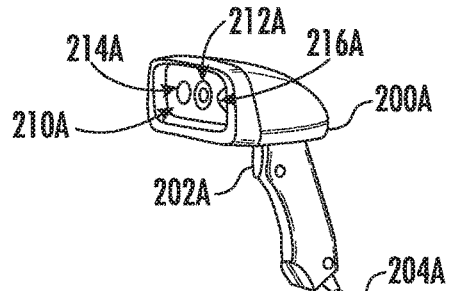
FIGS. 2A-I illustrate various types of housings which may be employed to house elements of the indicia reading apparatus, as introduced in FIG. 1, in accordance with some example embodiments described herein.
Figures 2B, 2C:
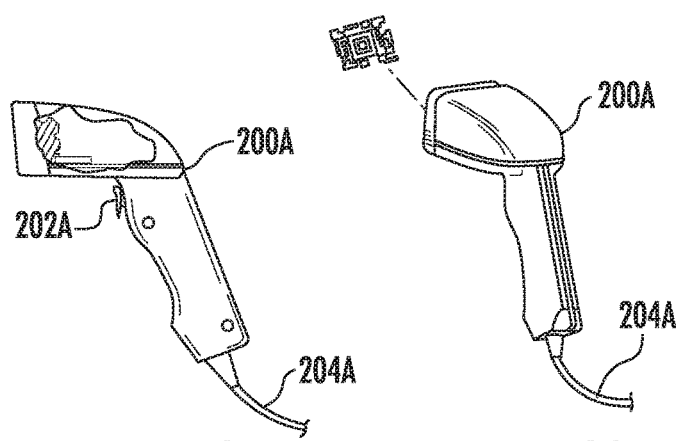
Figure 2D:
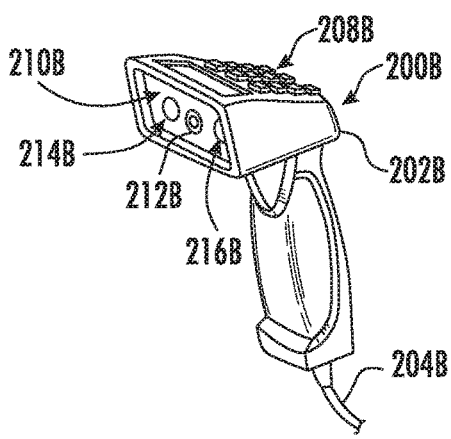
Figure 2E:
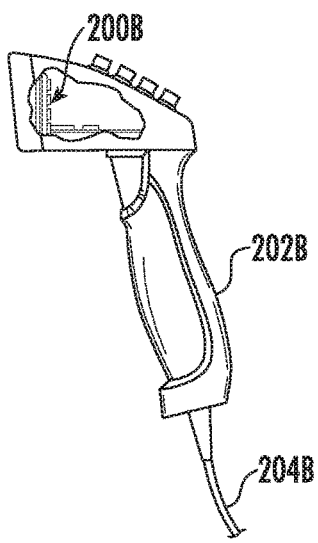
Figure 2F:
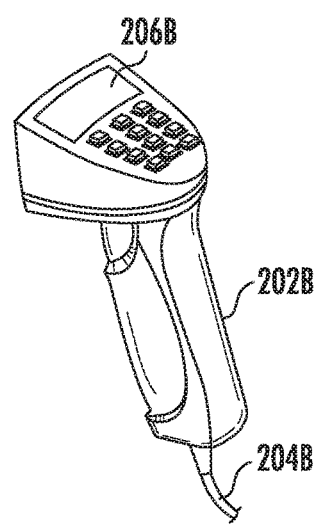
Figure 2G:
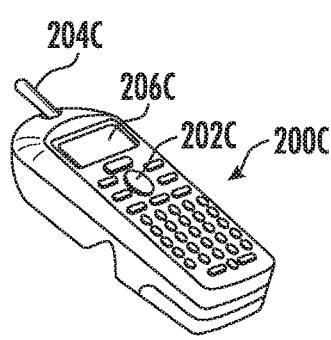
Figure 2H:
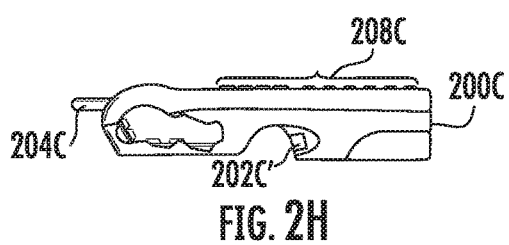
Figure 2I:
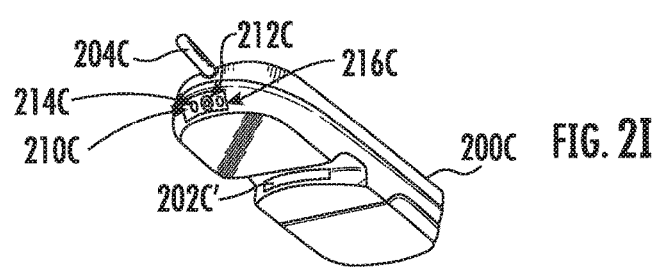

FIGS. 2A-I illustrate various types of housings which may be employed to house elements of the indicia reading apparatus 102, as introduced in FIG. 1. FIGS. 2A-2C show a first exemplary housing 200A, FIGS. 2D-2F show a second exemplary housing 200B, while FIGS. 2G-2I show a third exemplary housing 200C. The housings 200A, 200B, and 200C are preferably shaped so that they may fit comfortably into a human hand, and to include a finger actuatable trigger, 202A, 202B, and 202C. The third exemplary housing 200C is shown as having an auxiliary trigger 202C' which may supplement or replace trigger 202C. The housings 200A and 200B have extending therefrom multiconductor cable or tether 204A, 204B, for providing communication with a local host processor, whereas the third exemplary housing 200C has extending therefrom an antenna 204C for providing a communication with a local host processor. It is seen further that the housings 200B and 200C have incorporated therein displays 206B and 206C, for displaying information to a user, and a keyboard 208B and 208C for inputting data and commands to the image processing module 114. The housings 200A, 200B, and 200C further include scanning windows 210A, 210B, and 210C, respectively. The scanning windows 210A, 210B, and 210C include objective lenses 212A, 212B, and 212C, respectively. The scanning windows 210A, 210B, and 210C further include lighting layouts including lighting locations, depicted by (214A, 216A), (214B, 216B), and (214C, 216C), respectively, of the DPM illumination system 104, as further described in FIGS. 2J-2L.

Figure 2K:
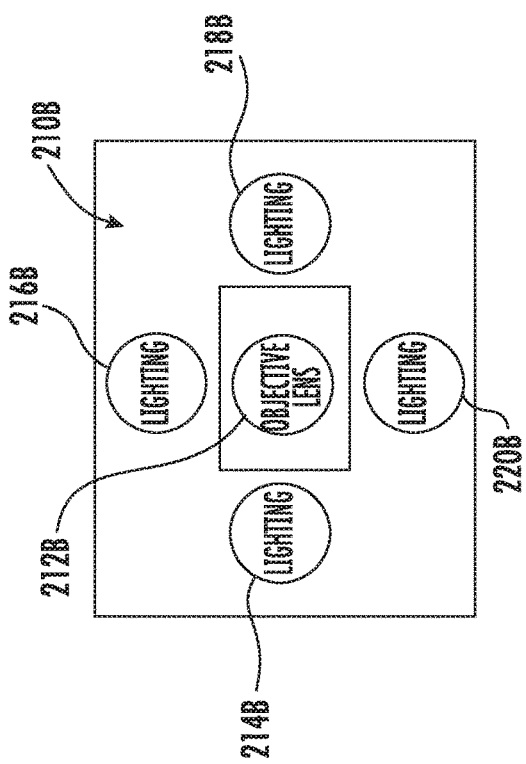
FIGS. 2J-2L illustrate various layouts of a DPM illumination system, in accordance with some example embodiments described herein.
Figure 2L:
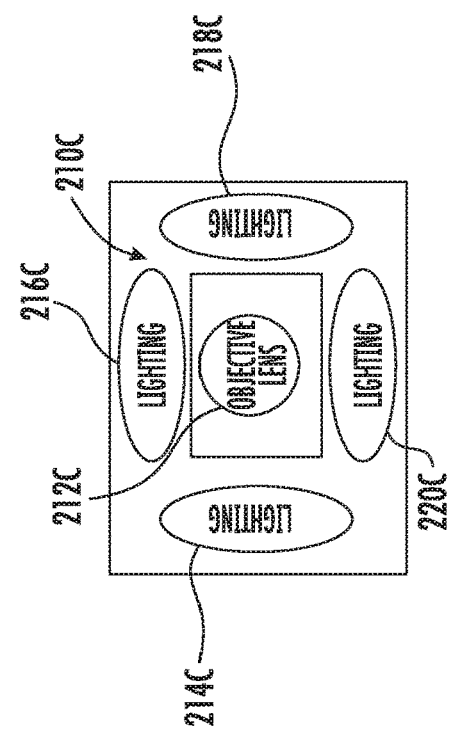
Figure 2J:
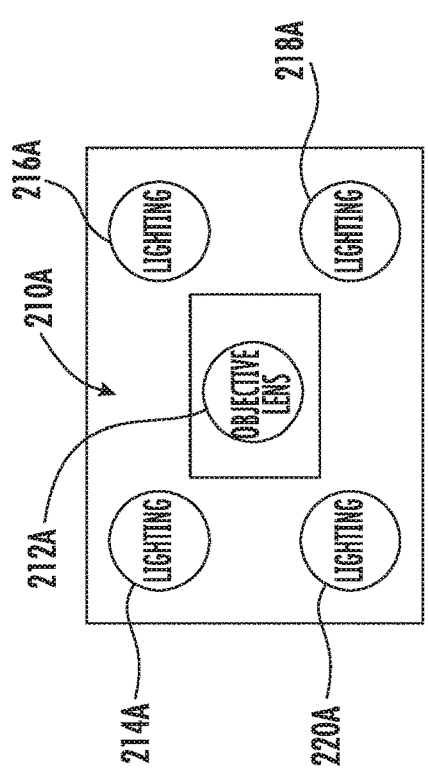

FIGS. 2J-2L illustrate various types of lighting layouts of the DPM illumination system, as introduced in FIGS. 2A-2I. In an example embodiment, various components of the DPM illumination system 104, such as collimating optical element, coupled with at least a diffractive optical element and a diffuser element, may be placed at the defined lighting locations, depicted by (214A, 216A), (214B, 216B), and (214C, 216C) on the scanning windows 210A, 210B, and 210C. Each of the scanning windows 210A, 210B, and 210C further includes well corrected objective lenses 212A, 212B, and 212C, with an illuminated reticle at its focal plane, which may be configured to replicate a target focused at infinity with little or no parallax. In an embodiment, as illustrated in a first lighting layout of the DPM illumination system 104 in FIG. 2J, in conjunction with FIGS. 2A-2C, various components of the DPM illumination system 104 may be placed at locations, depicted by 214A, 216A, 218A, and 220A. In another embodiment, as illustrated in a second lighting layout of the DPM illumination system 104 in FIG. 2K, in conjunction with FIGS. 2D-2F, various components of the DPM illumination system 104 may be placed at locations, depicted by 214B, 216B, 218B, and 220B. In yet another embodiment, as illustrated in a third lighting layout of the DPM illumination system 104 in FIG. 2L, in conjunction with FIGS. 2G-2I, various components of the DPM illumination system 104 may be placed at locations, depicted by 214C, 216C, 218C, and 220C. In various example embodiments, the boundary frames of the scanning windows 210A, 210B, and 210C may be, for example, circular or rectangular in shape, that surrounds the objective lens 184 of the indicia reading apparatus 102. Although the above three lighting layout of the DPM illumination system 104 have been described for three different housings 200A, 200B, and 200C, respectively, however, the present disclosure may be contemplated for implementing any lighting layout of the DPM illumination system 104 for any type of housing, without any deviation from the scope of the disclosure.

Figure 3A:
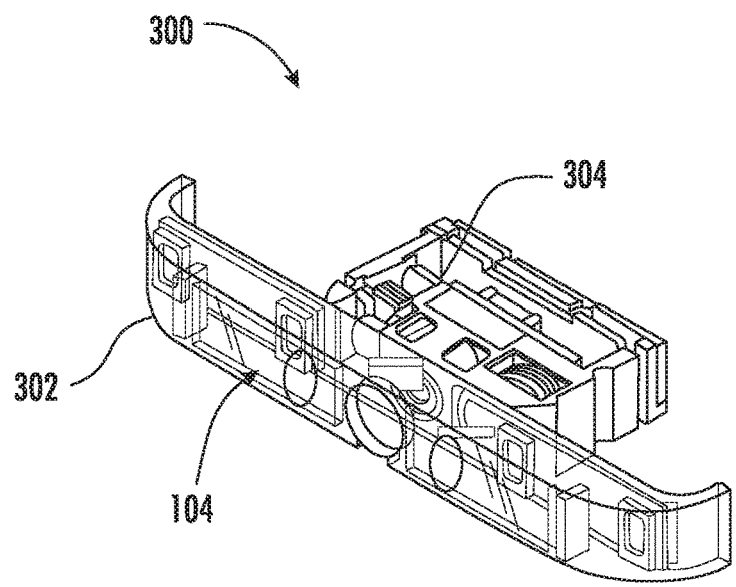
FIGS. 3A and 3B illustrate an embodiment of the DPM illumination system mechanically engaged with a housing of the indicia reading apparatus, in accordance with some example embodiments described herein.
Figure 3B:
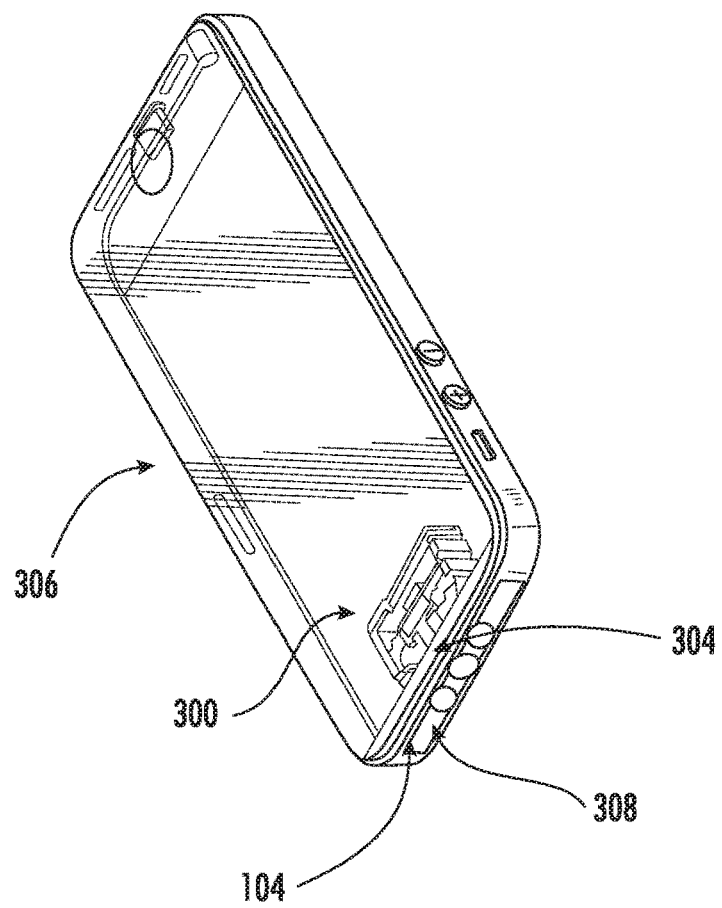

FIGS. 3A and 3B illustrate an embodiment of the DPM illumination system mechanically engaged with a housing of the indicia reading apparatus, in accordance with some example embodiments described herein. In such embodiment, the DPM illumination system 104 may be positioned within or with the housing of the indicia reading apparatus 102 in a manner, such that one or more specific elements, such as diffracted optical elements, collimated lens, and the diffusers, are coupled with the plurality of light sources 106 within the indicia reading apparatus 102.

In an exemplary embodiment, FIG. 3B illustrates a scanning and decoding system 300 in which the DPM illumination system 104 enclosed in a casing 302. As illustrated, the scanning and decoding system 300 includes an imaging engine 304 that, in accordance with various example implementation of said embodiments, may be mounted or plugged in a portable electronic device, for example, a personal digital assistant (PDT), a portable data terminal like a smartphone or a handheld device, as illustrated in FIG. 3B. In this regard, the imaging engine 304, may correspond to the imaging system 110, as described in reference to FIG. 1. In this aspect, the imaging engine 304 may be a front-end mount imaging engine. The scanning and decoding system 300 also includes the DPM illumination system 104 including various optical components as described in FIGS. 5 and 6.

FIG. 3B illustrates a mobile data terminal 306 comprising the scanning and decoding system 300 that includes the DPM illumination system 104 integrated in a case 308 of the mobile data terminal 306. In accordance with various embodiments, the case 308 may have a thin mobile phone edge mount structure. As illustrated, the scanning and decoding system 300 fits into front of the mobile data terminal 306. In accordance with various embodiments described herein, the mobile data terminal 306 is configured to support DPM barcode scanning by means of the scanning and decoding system 300. Alternatively or additionally, the case 308 may take the form of a case, a sled, and/or the like.

Figure 4:
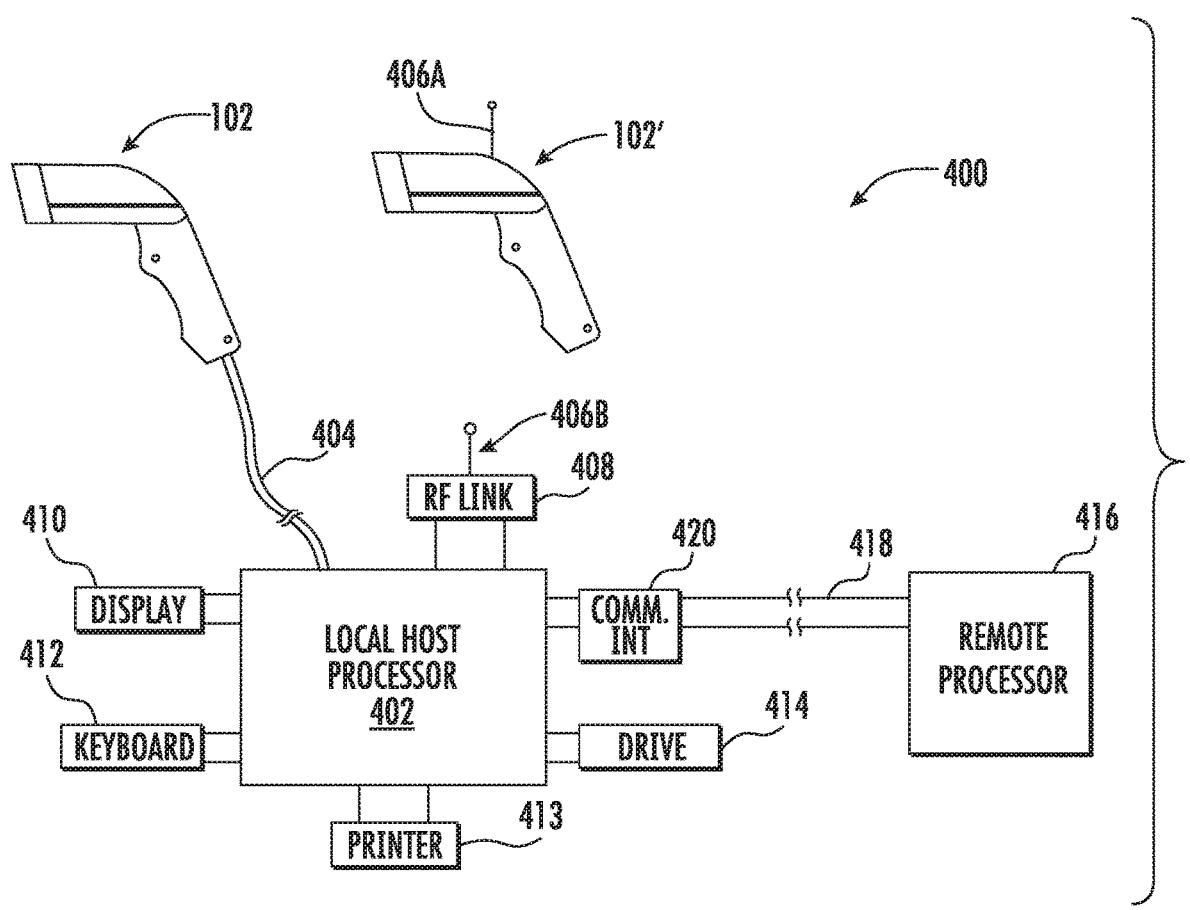
FIG. 4 illustrates an environment diagram for the indicia reading system, in accordance with some example embodiments of the disclosure.

FIG. 4 illustrates an environment diagram 400 for the indicia reading system 100, in accordance with some example embodiments of the disclosure. FIG. 4 illustrates the indicia reading apparatus 102 with the housing 200A or 200B, as illustrated in FIGS. 2A-2F, which is coupled to a local host processor 402 by means of multi-conductor flexible cable 404. The indicia reading apparatus 102 may also comprise a cordless battery powered indicia reading apparatus 102' which is coupled to the host processor 402 via a suitable RF link including antennae 406A and 406B and an RF interface module 408. The host processor 402 is preferably equipped with a display 410 by which the results of the previously described vector processing operations may be displayed, and with a printer 413 by which the previously described menu-bar code symbol may be printed. As used herein, the term "local host processor" will be understood to include both stand-alone host processors and host processors which comprise only one part of a local computer system.

If a new reader program is available locally, for example, on a Solid State Drive (SSD) or a Network Attached Storage (NAS), it may be loaded into the indicia reading apparatus 102 or 102' using a suitable drive unit 414, under the control of a keyboard 412 and the reprogramming routines. In addition to drive unit 414, the image processing module 114 is typically in communication with a read only program storage device, such as the EPROM 130, and a read/write storage device, such as the RAM 128, as illustrated in FIG. 1. If the new reader program is available at a remote processor 416, it may be loaded into the indicia reading apparatus 102 or 102' through a suitable transmission link 418, such as an electrical conductor link, a fiber optic link, or a wireless transmission link through a suitable communication interface 420, such as a modem. As used herein, the term "transmission link" will be understood to refer broadly to any type of transmission facility, including an RS-232 capable telephone line, an RF link, or a computer network, e.g., ETHERNET, cloud storage, or other such transmission facility. For example, the transmission link 418 may be provided by a coaxial cable or any other non-RF electromagnetic energy communication link including a light energy infrared or microwave communication link that may also be an acoustic communications link.

Figure 5:
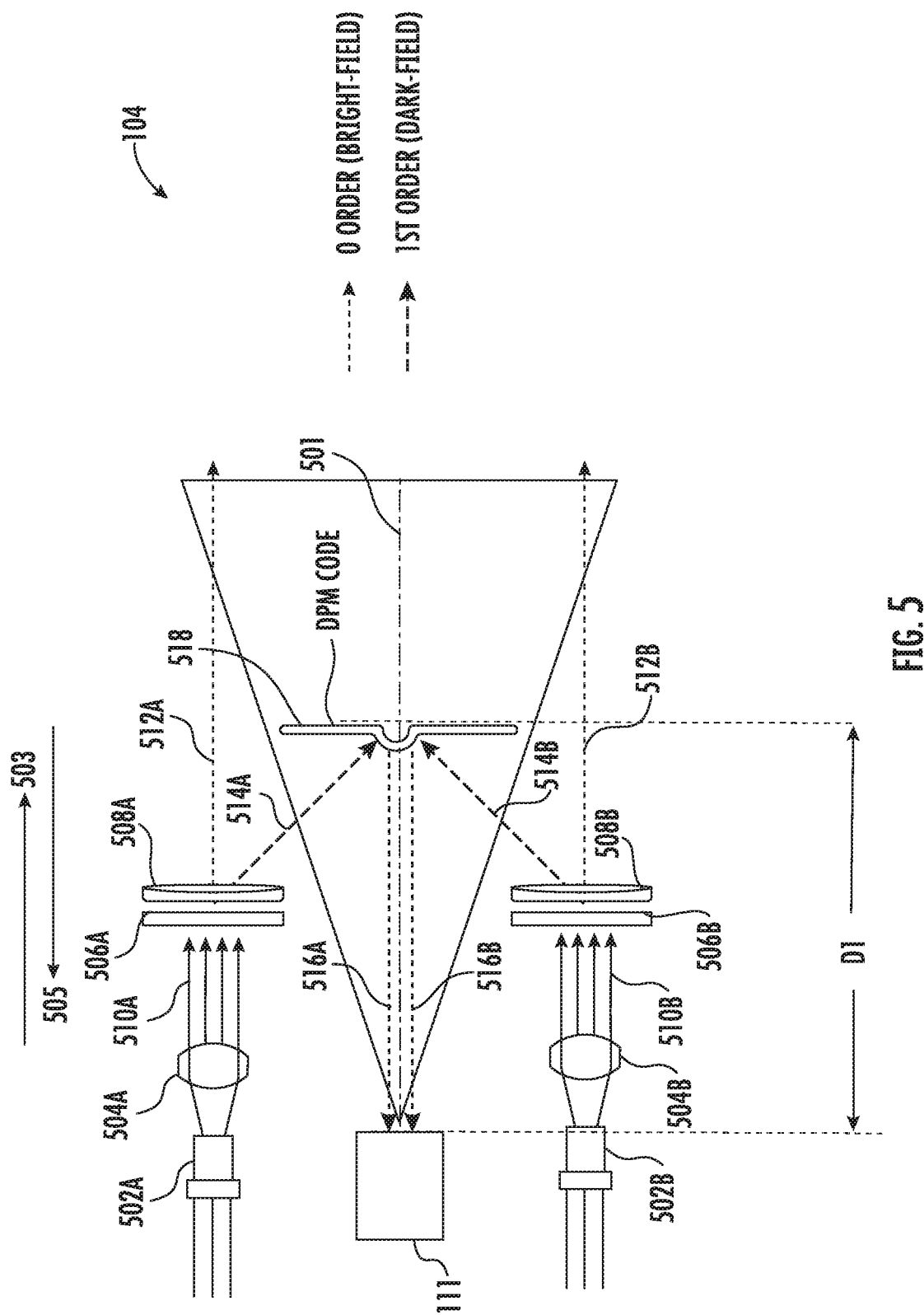
FIGS. 5 and 6 graphically depicts two block diagrams of the DPM illumination system in the indicia reading apparatus, in accordance with some example embodiments described herein.
Figure 6:
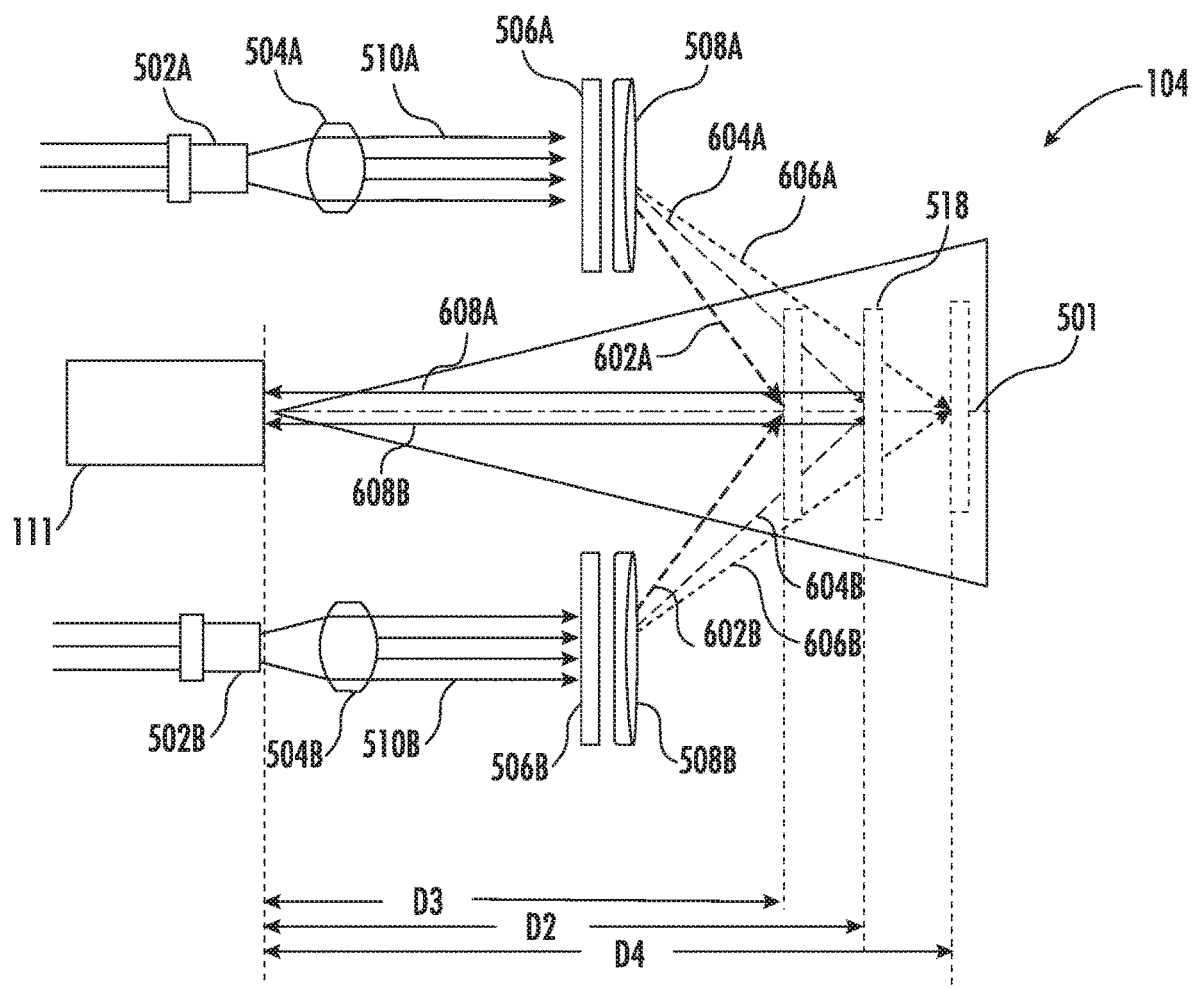

FIGS. 5 and 6 graphically depict two block diagrams of the DPM illumination system 104 in the indicia reading apparatus 102 and its operations for scanning a DPM indicia 518, in accordance with various embodiments described herein. Specifically, FIG. 5 illustrates a block diagram of the DPM illumination system 104 when the image sensor 111 includes monochrome sensors, in accordance with an embodiment of the disclosure. FIG. 6 illustrates another block diagram of the DPM illumination system 104 when the image sensor 111 includes color sensors, in accordance with another embodiment of the disclosure. FIGS. 5 and 6 illustrate a plurality of light sources 502A and 502B, a plurality of collimating optical elements 504A and 504B, a plurality of diffractive optical elements 506A and 506B, and a plurality of diffusers 508A and 508B. FIGS. 5 and 6 further illustrate a plurality of collimated light beams 510A and 510B.

In addition to the above components, FIG. 5 further illustrates a plurality of refracted light beams (512A, 512B) and (514A, 514B), and a plurality of reflected light beams 516A and 516B. There is further shown the DPM indicia 518 located at a first distance "D1" from the image sensor 111. The image sensor 111, as illustrated in FIG. 5, includes monochrome sensors. In addition to the above components, FIG. 6 further illustrates a plurality of refracted light beams that include a plurality of color components (602A, 604A, and 606A) and (602B, 604B, and 606B). There is further shown a DPM indicia 518 located at different distances, such as a second distance "D2", a third distance "D3", and a fourth distance "D4" from the image sensor 111. The image sensor 111, as illustrated in FIG. 6, includes color sensors. In some examples, the color sensors follow the Bayer pattern The plurality of light sources 502A and 502B, may preferably take the form of laser diodes or light emitting diodes (LEDs), emitting light at visible or infrared frequencies. In an embodiment, each of the plurality of light sources 502A and 502B may correspond to a broadband light source or a multi-color light source having different wavelengths. In other words, the light beams generated by the plurality of light sources 502A and 502B may comprise a plurality of rays having different angles of incidence on the DPM indicia 518 in an instance in which the indicia reading system 100 operates in, for example the dark-field illumination mode. The broadband light source may correspond to superluminescent light sources, such as tungsten lightbulbs, superluminescent diodes (SLEDs), or edge-emitting luminescent diodes (ELEDs), the light beams which exhibit a high spatial coherence. The multi-color light sources, for example RGB organic light emitting diodes, may correspond to light sources emitting light beams of different wavelengths optically combined into the same optical path. The plurality of light sources 502A and 502B, may be aligned on an illumination board in accordance with one of the various layouts, such those as illustrated in FIGS. 2J-2L.

Each of the plurality of light sources 502A and 502B, may be individually actuated by the image processing module 114 concurrent to the acquisition of an image of the DPM indicia 518 both in case of dark-field illumination and bright-field illumination. The plurality of light sources 502A and 502B, may be energized by the power input unit in the indicia reading apparatus 102. Typically, for decoding DPM types of the indicia, illumination with high intensity of light is desired for accurately scanning multiple indicia, such as the DPM indicia 518, on a surface of the workpiece target T. In this aspect, the plurality of light sources 502A and B, in accordance with various embodiments, is adapted to provide high intensity illumination by projecting the light beams towards the plurality of collimating optical elements 504A and 504B, which is further directed towards the workpiece target T (the surface of which includes the DPM indicia 518) in a first direction 503 along the imaging axis 501 of the image sensor 111 in the indicia reading apparatus 102.

Referring back to FIG. 5, the plurality of collimating optical elements 504A and 504B may receive light beams from the corresponding plurality of light sources 502A and 502B, focus the light beams, and align the light beams to a specific direction, making them parallel or collimated, depicted by the plurality of collimated light beams 510A and 510B. Each of the plurality of collimating optical elements 504A and 504B may be used for reducing the spatial cross section of the light beams, thereby, making them narrower relative to each other.

The plurality of diffractive optical elements 506A and 506B, which may be referred to as configurable spectral filters, may be configured to decompose the light beams into component frequencies (wavelengths). Each of the plurality of diffractive optical elements 506A and 506B, directs a specific part of the light beams in a specific direction or onto a specific focal point. In an embodiment, the plurality of diffractive optical elements 506A and 506B may include a system of movable diffractive microstructures on a substrate such that by applying different voltages to the plurality of diffractive optical elements 506A and 506B, relative positions of the microstructures may be altered and consequently, the spectral composition of the diffracted light beams may be altered. In an embodiment, a grating pitch of each of the plurality of diffraction gratings of the plurality of diffractive optical elements 506A and 506B may be gradually varied. Accordingly, edges between corresponding grating portions of the plurality of diffraction gratings may be shifted close or apart, and accordingly as the grating pitch of each grating portion may be changed. In an embodiment, the plurality of diffractive optical elements 506A and 506B may be transmissive optical elements. Alternatively, the plurality of diffractive optical elements 506A and 506B may be reflective optical elements.

The plurality of diffusers 508A and 508B, may be refractive elements that may be combined with a random surface profile by processes, such as holographic exposure, sandblasting or programmatically. The plurality of diffusers 508A and 508B may be configured to convert the incident light beams, such as a plurality of light beams received from the plurality of diffractive optical elements 506A and 506B, into clusters of scattered rays and may be individually enabled or disabled based on the mode of illumination, such as the dark-field illumination mode and/or the bright-field illumination mode, for illuminating the DPM indicia 518.

In an embodiment, the plurality of diffusers 508A and 508B may be enabled or disabled based on a readability index of the DPM indicia 518 once a first image or a second image is reconstructed by the image processing module 114. The readability index may correspond to a metric that whether the image processing module 114 can process the image data and/or the decoder module 172 can decode the processed image data.

In an embodiment, to generate the readability index of the DPM indicia 518, the image processing module 114 may be configured to determine image parameters of the reconstructed first image or the second image based on various image processing and computer vision techniques. Such image parameters may include, but not limited to, a contrast level, a resolution level, an artifacts level, a blur level, a noise level, a specular reflection level, or a distortion level.

Typically, the contrast level corresponds to a measurement of the image processing module 114 to clearly separate the light and dark areas in the reconstructed first image or the second image of the DPM indicia 518. The resolution corresponds to an ability of the image processing module 114 to clearly define a specific size or feature of a specific pattern of the reconstructed first image or the second image of the DPM indicia 518. The artifacts correspond to errors in the perception or representation of information of the reconstructed first image or the second image of the DPM indicia 518, introduced by the involved optical or software components of the indicia reading apparatus 102. The blur corresponds to distinct identification of regions in the reconstructed first image or the second image of the DPM indicia 518, which have sharpness below an acceptable value. The noise level corresponds to one or more color components in the reconstructed first image or the second image of the DPM indicia 518, that do not contribute to the desired image. The specular reflection corresponds to a surface reflectance of light from the surface that includes the DPM indicia 518, due to which image quality of the reconstructed first image or the second image falls below an acceptable value. The distortion level may correspond to an alteration in the reconstructed first image or the second image of the DPM indicia 518 caused by imperfections or faults in one or more optical components of the indicia reading apparatus 102.

In an embodiment, the image processing module 114 may be further configured to determine a cumulative value of such image parameters of the reconstructed first image or the second image based on a weighted average of such image parameters. Based on the weighted average of such image parameters, the image processing module 114 may be configured to determine the readability index.

In case the readability index is greater than a threshold readability index, the image data is of higher quality and hence, higher clarity. In case the readability index is lesser than the threshold readability index, the image data is of lower quality and hence, lower clarity. In various embodiments, the readability index may be affected by the degree of specular reflection observed by the image sensor 111, which in turn, may be programmatically controlled by suitable incorporation of the plurality of diffusers 508A and 508B relative to the plurality of diffractive optical elements 506A and 506B.

In an embodiment, based on a low readability index, the plurality of diffusers 508A and 508B may be selectively enabled by electrical signals that are generated in accordance with instructions generated by the microprocessor in the indicia reading system 100, as described in FIG. 1. In another embodiment, based on a high readability index, the plurality of diffusers 508A and 508B may be selectively disabled by the electrical signals that are generated in accordance with instructions generated by the microprocessor in the indicia reading system 100.

In an alternate embodiment, based on a low readability index, the plurality of diffusers 508A and 508B may be selectively attached and coupled with the DPM illumination system 104. In another embodiment, based on a high readability index, the plurality of diffusers 508A and 508B may be selectively detached and decoupled from the DPM illumination system 104.

The plurality of collimated light beams 510A and 510B are the light beams whose rays are parallel, and therefore spread minimally during propagation towards the plurality of diffractive optical elements 506A and 506B, respectively. The plurality of collimated light beams 510A and 510B does not indicate any divergence, thus do not disperse with distance. In this aspect, the plurality of collimating optical elements 504A and 504B is adapted to collimate light beams received from the plurality of light sources 502A and 502B, such that the plurality of collimated light beams 510A and 510B is directed towards the DPM indicia 518 in the first direction 503 along the imaging axis 501 of the image sensor 111 in the indicia reading apparatus 102.

As illustrated in FIG. 5, the plurality of refracted light beams (512A, 514A) and (512B, 514B), in an embodiment, are the light beams that are split up by the plurality of diffractive optical elements 506A and 506B, and/or the plurality of diffusers 508A and 508B in accordance with specific diffraction orders. In this aspect, the plurality of diffractive optical elements 506A and 506B may be adapted to split the plurality of collimated light beams 510A and 510B received from the plurality of collimating optical elements 504A and 504B such that the plurality of refracted light beams (512A, 514A) and (512B, 514B) are directed towards the DPM indicia 518 at different diffraction orders in the first direction 503 along the imaging axis 501 of the image sensor 111 in the indicia reading apparatus 102.

In an embodiment, the plurality of diffractive optical elements 506A and 506B may be tuned by the image processing module 114 such that the plurality of collimated light beams 510A and 510B are split into at least two sets of light beams with at least two diffraction orders utilized for different illumination modes for reading the DPM indicia 518. In an embodiment, the first set of refracted light beams 512A and 512B, with a zero-diffraction order may be utilized for bright-field illumination of the DPM indicia 518 when the DPM indicia 518 that is being read by the indicia reading apparatus 102 is located at the first distance "D1" from the image sensor 111. Each of the first set of refracted light beams 512A and 512B may be incident at the DPM indicia 518 at a first incident angle so as to cause a bright-field illumination of the DPM indicia 518 in a far-field area.

A second set of refracted light beams 514A and 514B, with a first-diffraction order may be utilized to cause a dark-field illumination of the DPM indicia 518 located at the first distance "D1" from the image sensor 111. Each of the second set of refracted light beams 514A and 514B may be incident to the DPM indicia 518 at a second incident angle so as to cause dark-field illumination of the DPM indicia 518 in near-field area.

The plurality of reflected light beams 516A and 516B, in an embodiment of FIG. 5, correspond to light beams that are a result of a reflection of the second set of refracted light beams 514A and 514B from the surface that includes the DPM indicia 518. In this aspect, the DPM indicia 518 may be adapted to reflect the incident plurality of refracted light beams (512A, 514A) and (512B, 514B) received from the plurality of diffractive optical elements 506A and 506B and/or the plurality of diffusers 508A and 508B, such that the plurality of reflected light beams 516A and 516B are directed back towards the image sensor 111 in a second direction 505 along the imaging axis 501 of the image sensor 111 in the indicia reading apparatus 102.

In an embodiment, when the image sensor 111 includes monochrome sensors as illustrated in FIG. 5, the plurality of reflected light beams 516A and 516B received from the DPM indicia 518 correspond to at least one set of refracted light beams, i.e. the second set of refracted light beams 514A and 514B. In such a case, the image sensor 111 receives the plurality of reflected light beams 516A and 516B.

In an example embodiment, the image sensor 111 generates first image data of the DPM indicia 518 based on the plurality of reflected light beams 516A and 516B received from the DPM indicia 518 in accordance with the dark-field illumination performed on the DPM indicia 518. Based on the generated first image data of the DPM indicia 518, the image processing module 114 may be configured to reconstruct a first image that is a monochrome image.

In an embodiment, for reconstructing the first image that is a monochrome image, the image sensor 111 includes monochrome sensor that detects light intensity, i.e. intensity of the plurality of reflected light beams 516A and 516B, but with minimal wavelength specificity. As the image sensor 111 may not identify the range of wavelengths in the light beams, i.e. the plurality of reflected light beams 516A and 516B, the image sensor 111 may not separate color information in the light beams. Instead, the image sensor 111 captures all the incoming light to produce the monochrome image.

In an example embodiment, the image processing module 114 may be configured to determine brightness value of each pixel based on the detected light intensity of the plurality of reflected light beams 516A and 516B. In an example, for each pixel, the brightness value may be determined using 8 bits. Thus, the image processing module 114 may be configured to determine (0-255) different brightness (i.e. gray) levels. Accordingly, the image processing module 114 may be configured to generate the monochrome image based on the determined brightness levels of the pixels.

The image processing module 114 may be further configured to decode the reconstructed first image when an image characteristic, such as contrast level, of the reconstructed first image exceeds a threshold contrast level.

In another embodiment, as illustrated in FIG. 6, each of the second set of refracted light beams 514A and 514B may be further split into light beams that constitute the plurality of color components, such as depicted by (602A, 604A, and 606A) and (602B, 604B, and 606B), respectively. The plurality of color components (602A, 604A, and 606A) and (602B, 604B, and 606B) may depend upon the type of the color model utilized for image processing, for example, an RGB color model, an CMYK color model, and the like.

FIG. 6 illustrates an RGB model based on the second set of refracted light beam 514A that is split into a red color component, depicted by 602A, a green color component, depicted by 604A, and a blue color component, depicted by 606A Similarly, the other of the second set of refracted light beam 514B is shown to be split into a red color component, depicted by 602B, a green color component, depicted by 604B, and a blue color component, depicted by 606B.

FIG. 6 illustrates an example embodiment whereby the image sensor 111 includes color sensors. In such an embodiment, the set of reflected light beams 608A and 608B received from the DPM indicia 518 corresponds to at least one set of refracted light beams, i.e. the second set of refracted light beams 514A and 514B. In such a case, the image sensor 111 receives a portion of the set of reflected light beams 608A and 608B, as each of the color filters in the color filter array of the image sensor 111 filters only one of the three color components. For example, red color filters only filter red color component from the set of reflected light beams 608A and 608B and block other two color components (i.e. green and blue color components), green color filters only filter green color component from the set of reflected light beams 608A and 608B and block other two color components (i.e. red and blue color components), and blue color filters only filter blue color component from the set of reflected light beams 608A and 608B and block other two color components (i.e. red and green color components).

In an embodiment, a color incident angle of each color component of the plurality of color components (602A, 604A, and 606A) and (602B, 604B, and 606B) is based on a wavelength of corresponding color component. For example, as illustrated in FIG. 6, the color incident angle of the red color components, depicted by 602A and 602B, of the refracted light beam is maximum because the wavelength of red color component is maximum relative to the wavelengths of the green and blue color components. The color incident angle of the blue color components, depicted by 606A and 606B, of the refracted light beam is minimum because wavelength of blue color component is minimum relative to the wavelengths of the red and green color components. Further, the color incident angle of the green color components, depicted by 604A and 604B, of the refracted light beam is intermediate because wavelength of the green color component is intermediate relative to the wavelengths of the red and blue color components. The characteristics of the plurality of color components (602A, 604A, and 606A) and (602B, 604B, and 606B) in the set of reflected light beams 608A and 608B is based on distance of the DPM indicia 518 from the image sensor 111. For example, at the second distance "D2" of the DPM indicia 518 from the image sensor 111, as illustrated in FIG. 6, the intensity of green color components 604A and 604B in the set of reflected light beams 608A and 608B is maximum. At a third distance "D3" of the DPM indicia 518 from the image sensor 111, as illustrated in FIG. 6, the intensity of red color components 602A and 602B in the set of reflected light beams 608A and 608B is maximum. At a fourth distance "D4" of the DPM indicia 518 from the image sensor 111, as illustrated in FIG. 6, the intensity of blue color components 606A and 606B in the set of reflected light beams 608A and 608B is maximum.

In an embodiment, the image sensor 111 may be configured to generate second image data of the DPM indicia 518 based on the set of reflected light beams 608A and 608B received from the DPM indicia 518 in accordance with the dark-field illumination performed on the DPM indicia 518. Based on the generated second image data of the DPM indicia 518, the image processing module 114 may be configured to reconstruct a binary image or a second image of the DPM indicia 518.

In an embodiment, the image processing module 114, based on the second image data, may be configured to reset a pixel value to a specific value for the reconstruction of the binary image of the DPM indicia 518, based on defined criteria when one or more characteristics of the color components in the set of reflected light beams 608A and 608B is less than first threshold values.

In an embodiment, the defined criteria may correspond to a comparison of an average value of the plurality of color components (602A, 604A, and 606A) and (602B, 604B, and 606B) with a specified level. For each pixel, if corresponding pixel value is less than the specified level, the corresponding pixel value is reset to zero, and if corresponding pixel value is greater than the specified level, the corresponding pixel value is reset to 1. Consequently, the image processing module 114 may be configured to reconstruct the binary image of the DPM indicia 518 as a black and white image.

In an embodiment, when the characteristics of the set of reflected light beams 608A and 608B exceed the first threshold values, separate plurality of color planes are generated. Further, if the characteristics of the color planes exceed second threshold values, the image processing module 114 may be configured to select a color plane of a plurality of color planes for the reconstruction of the second image based on a distance between the image sensor 111 and the DPM indicia 518. In such a case, the characteristics of the selected color plane is the highest amongst the plurality of color planes.

Figure 7A:
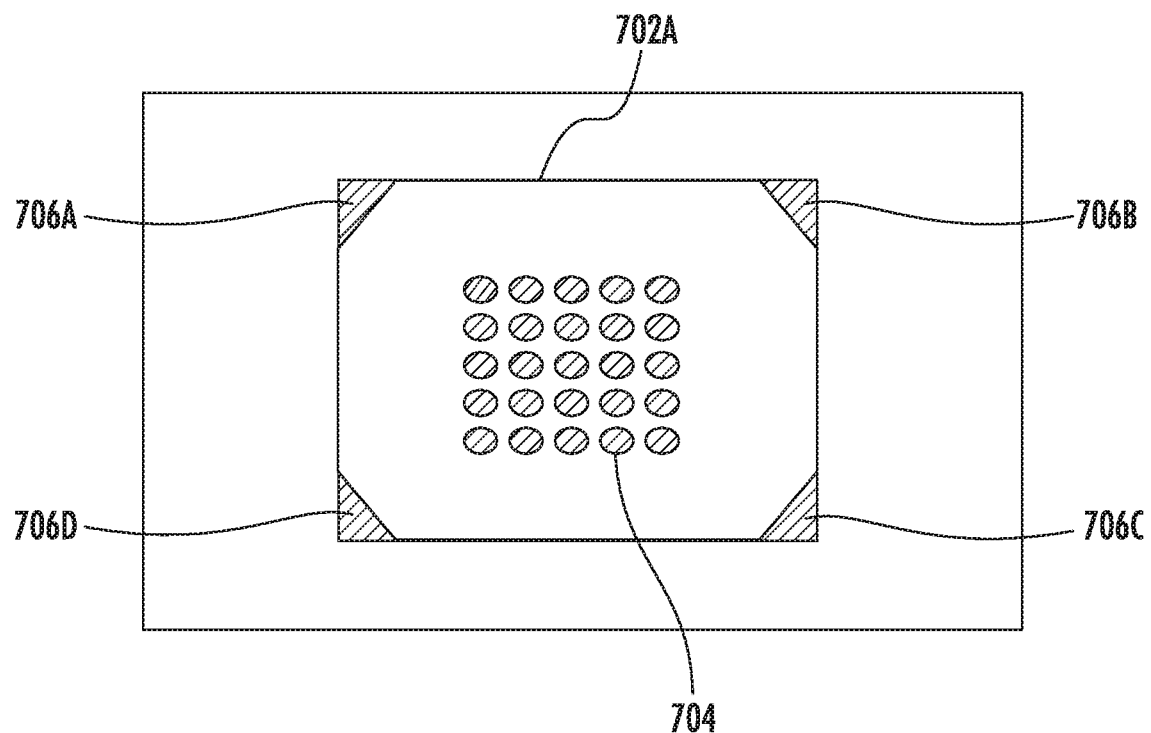
FIGS. 7A and 7B illustrate exemplary reconstructed images, in accordance with some example embodiments described herein.

In another embodiment, when the characteristics of the set of reflected light beams 608A and 608B are less than the first threshold values and the characteristics of the generated color planes are also less than the second threshold values, the image processing module 114 may be configured to determine a color of each pixel for the second image based on a combination of the plurality of color components (602A, 604A, and 606A) and (602B, 604B, and 606B) for the reconstruction of the second image, for example, a second image 702A illustrated in FIG. 7A.

In an embodiment, for reconstructing the second image that is a colored image, the color sensor (in the image sensor 111) receives and converts optical images into electronic signals that convey image information, i.e. the second image data. Further, the color filter array (in the image sensor 111), which is a mosaic of color filters, may be placed over pixels of the color sensor to capture color information. The color filters filter the set of reflected light beams 608A and 608B received from the DPM indicia 518 by wavelength range so that filtered wavelengths that provide corresponding color information are captured by different pixels on the color sensor. That is, a specific type of color information may be captured at a pixel of the color sensor based on the overlaying color filter. Accordingly, only a certain amount of incoming set of reflected light beams 608A and 608B is captured by the color sensor as the pixels only receive portions of the set of reflected light beams 608A and 608B that have been filtered based on color. For example, for the commonly implemented Bayer filter which is a mosaic of Red-Green-Green-Blue filters (i.e. a filter pattern of 50% green, 25% red and 25% blue), only one of the three primary colors in incoming set of reflected light beams 608A and 608B is captured at each pixel. In at least some example embodiments, other types of color filter arrays may be implemented such as a Red-Green-Blue-Emerald filter, Cyan-Yellow-Yellow-Magenta filter, Cyan-Yellow-Green-Magenta filter, etc. The filtered and captured set of reflected light beams 608A and 608B may be then converted to a full colored image by the image processing module 114 based on a demosaicing algorithm. More specifically, the demosaicing algorithm interpolates for missing colors in each of the pixels to create a completely colored image, which is the second image. Accordingly, the image processing module 114 may be configured to generate the second image, which is a colored image.

Various threshold values, such as the first threshold values and the second threshold values, in some embodiments, may be set by the user. In other embodiments, the threshold values may be automatically configured by the image processing module 114 at run time. In yet some other embodiments, the threshold values may be pre-set and stored in EPROM 130 at the time of manufacture. However, whatsoever may be the means of setting the threshold values, the scope of the disclosure is not limited and not deviated.

Referring to FIG. 7A, the second image 702A includes a first portion, depicted by 704, and a plurality of second portions, depicted by 706A-706D. The first portion, depicted by 704, corresponds to an image that is reconstructed based on one or more color components, such as red color components 602A and 602B, and green color components 604A and 604B, when the DPM indicia 518 is positioned between the second distance "D2" and the third distance "D3" relative to the image sensor 111. However, there also may be present, for example the blue color components 606A and 606B, which does not contribute to the reconstruction of the second image 702A, but appear as noise color components or specular reflection in, for example, the plurality of second portions, depicted by 706A-706D. In such a case, the image processing module 114 may be configured to remove such noise color components appearing in, for example, the plurality of second portions, depicted by 706A-706D, from the reconstructed second image, based on one or more image processing techniques, such as chroma and luminance noise separation, linear smoothing filters, nonlinear filters, statistical methods, block-matching algorithms, deep learning, and the like.

In an example embodiment, as shown in FIG. 7A, the blue color components 606A and 606B, may appear as scattered components across the corners, for example, the plurality of second portions, depicted by 706A-706D, in the second image 702A. In other words, the blue color components 606A and 606B, may appear as disturbances, and the pixels in the plurality of second portions, depicted by 706A-706D, appear to be in a different color and/or intensity from surrounding pixels. Further, the value of such pixels in the plurality of second portions, depicted by 706A-706D, may bear no relation to the color and intensity of surrounding pixels.

In such a case, the noise components, i.e. the blue color components 606A and 606B, may be removed from the second image 702A based on, for example, a linear filtering technique, such as linear smoothing filters. In linear smoothing filtering, the image processing module 114 may be configured to remove the noise, i.e. the blue color components 606A and 606B, appearing in the plurality of second portions, depicted by 706A-706D, by convolving the second image 702A with a mask that represents a low-pass filter. The low-pass filter may be a filter that passes color components (such as red and green color components) with a frequency lower than a certain cutoff frequency and attenuates color components (such as blue color component) with frequencies higher than the cutoff frequency. Such convolution adjusts the value of each pixel appearing in the plurality of second portions, depicted by 706A-706D, such that the pixel values in such portions match with the pixel values of its neighbors. In various embodiments, the adjustment of each pixel appearing in the plurality of second portions, depicted by 706A-706D, may be based on an average value, or a weighted average, of itself and its nearby neighbors.

Consequently, the image processing module 114 may be configured to filter the second image 702A and generate a final second image 702B, which does not include the noise color components appearing in, for example, the plurality of second portions, depicted by 706A-706D.

The image processing module 114 may be further configured to decode the reconstructed binary image or the second image 702B when the contrast level of the reconstructed second image 702B exceeds a threshold contrast level. Finally, the image processing module 114 may be configured to cause the binary image or the reconstructed second image 702B to be displayed on a display screen in an instance when the decoding of the binary image or the reconstructed second image 702B is successful.

Figure 8:
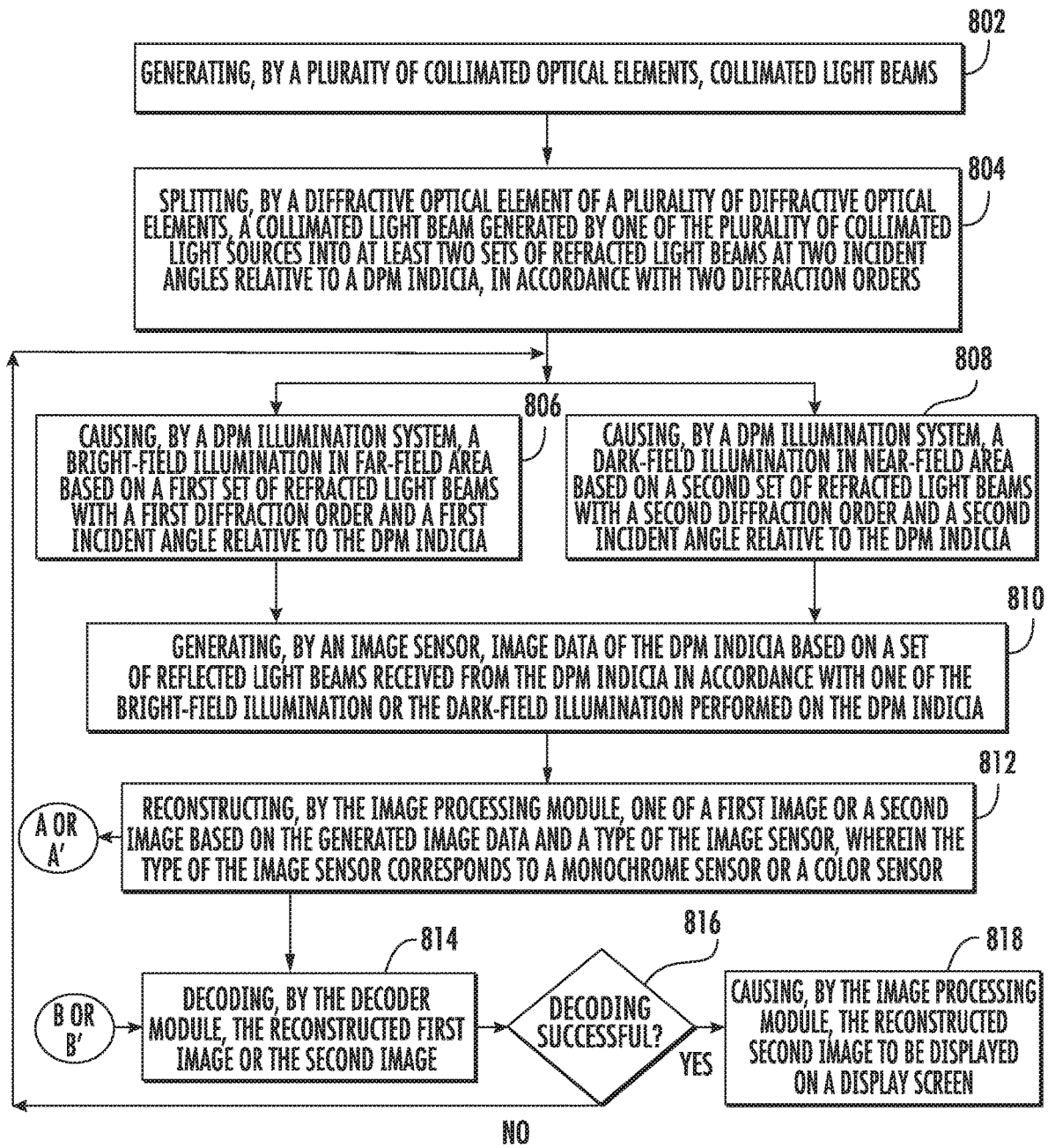
FIG. 8 illustrates an example flowchart of operations performed by indicia reading apparatus for reading and decoding the DPM indicia, in accordance with some example embodiments described herein.

FIG. 8 illustrates an example flowchart of operations performed by the indicia reading apparatus 102 (or the scanning and decoding system 300) of FIG. 1 (or FIGS. 3A and 3B), respectively, in accordance with example embodiments described herein. It will be understood that each block of the flowcharts, i.e. the flowcharts illustrated in FIGS. 8-10, and combinations of blocks in the flowchart s, i.e. the flowcharts illustrated in FIGS. 8-10, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 8-10, when executed, convert a computer or processing circuitry into a particular machine configured to perform an example embodiment of the present invention. Accordingly, the operations of FIGS. 8-10 define algorithms for configuring a computer or processor, to perform an example embodiment. In some cases, a general-purpose computer may be provided with an instance of the processor which performs the algorithms of FIGS. 8-10 to transform the general-purpose computer into a particular machine configured to perform an example embodiment.

Figure 9:
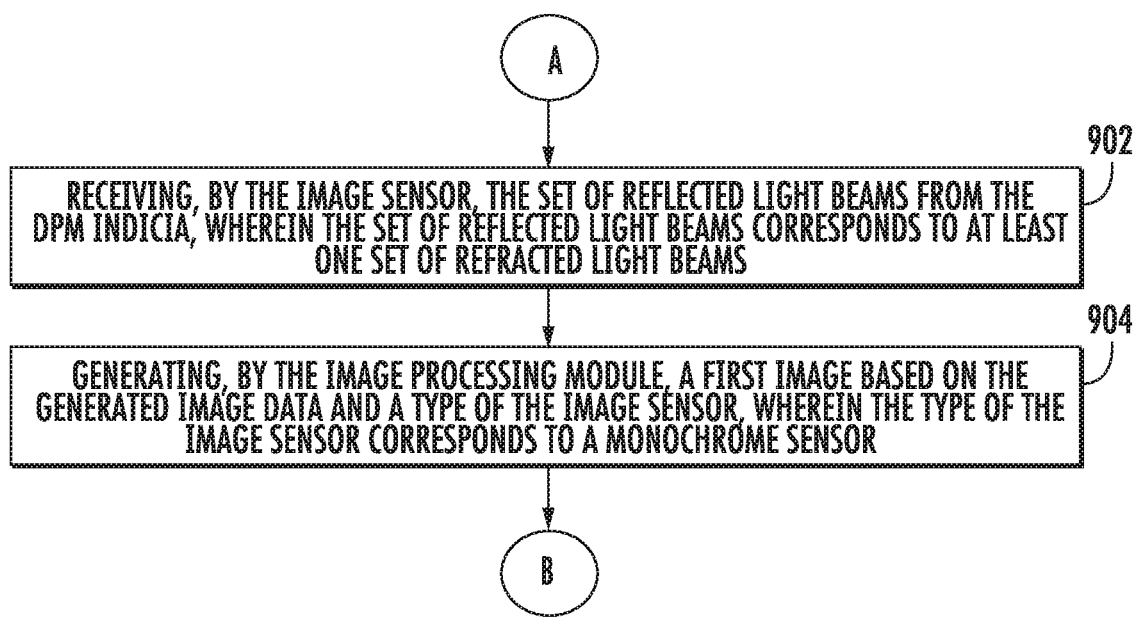
FIG. 9 illustrates an example flowchart of operations performed by the indicia reading apparatus for reconstruction of a first image of the DPM indicia, in accordance with some example embodiments described herein.
Figure 10:
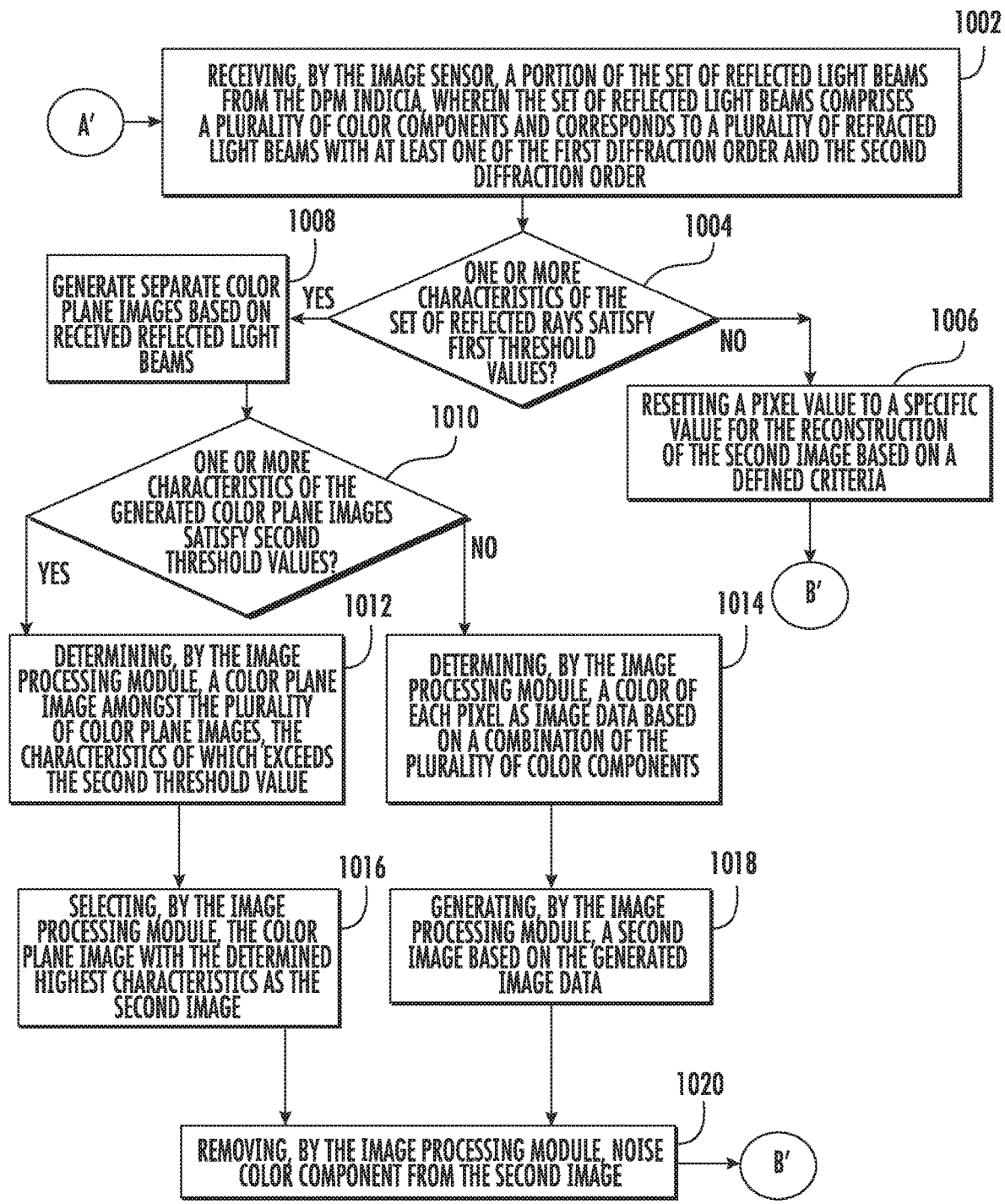
FIG. 10 illustrates an example flowchart of operations performed by the indicia reading apparatus for reconstruction of a second image of the DPM indicia, in accordance with some example embodiments described herein.

Accordingly, blocks of the flowcharts, i.e. the flowcharts illustrated in FIGS. 8-10 support combinations of means for performing the specified functions and combinations of operations for performing the specified functions. It will also be understood that one or more blocks of the flowcharts', and combinations of blocks in the flowcharts, i.e. the flowcharts illustrated in FIGS. 8-10, can be implemented by special purpose hardware-based computer systems which perform the specified functions, or combinations of special purpose hardware and computer instructions.

Turning to operation 802, the DPM illumination system 104 may include means, such as the plurality of collimated optical elements 504A and 504B, for generating collimated light beams, such as the plurality of collimated light beams 510A and 510B. In an embodiment, the plurality of collimating optical elements 504A and 504B may receive light beams from the corresponding plurality of light sources 502A and 502B, focus the received light beams, and align the focused light beams to an aligned direction, making them parallel or collimated, depicted by the plurality of collimated light beams 510A and 510B. In an embodiment, each of the plurality of light sources 502A and 502B may correspond to a broadband light source or a multi-color light source. The light beams, received by the plurality of collimating optical elements 504A and 504B, may have different wavelengths. In other words, the light beams may comprise a plurality of rays having different angles of incidence on the DPM indicia 518 in an instance in which the indicia reading system 100 operates in, for example the dark-field illumination mode, as illustrated in FIGS. 5 and 6.

In accordance with one example embodiment, the scanning of the DPM indicia 518 is initiated based on the operation 802, which in turn is executed based on an actuation of a trigger, such as the triggers 202A, 202B, or 202C, by the user. In accordance with another example embodiment, the trigger may be actuated automatically by a control unit, such as the illumination control unit 144, based on the presence of a DPM indicia, such as the DPM indicia 518, in vicinity of the scanning and decoding system 300. In this regard, in accordance with various embodiments described herein, the plurality of collimating optical elements 504A and 504B, collimates the received illumination (i.e. the light beams) from the plurality of light sources 502A and 502B, and directs the plurality of collimated light beams 510A and 510B to travel along the first direction 503, which is parallel to the direction of the imaging axis 501 of the image sensor 111.

Turning to operation 804, the DPM illumination system 104 may include means, such as the plurality of diffractive optical elements 506A and 506B, for splitting the collimated light beams, such as the plurality of collimated light beams 510A and 510B, generated by the plurality of collimating optical elements 504A and 504B. The plurality of diffractive optical elements 506A and 506B, may be configured to split the plurality of collimated light beams 510A and 510B into at least two sets of refracted light beams at two incident angles relative to a DPM indicia, such as the DPM indicia 518, in accordance with two diffraction orders.

For example, in an embodiment, the diffractive optical element 506A receives the collimated light beam 510A on a first surface, which is facing towards the plurality of collimating optical element 504A, splits the collimated light beam 510A into the refracted light beams 512A and 514A. The refracted light beam 512A is of a zero-diffraction order that may be utilized for bright-field illumination. The refracted light beam 512A is incident at the DPM indicia 518 at a first incident angle relative to the imaging axis 501 of the image sensor 111 and causes the bright-field illumination of the DPM indicia 518 in the far-field area. Further, the refracted light beam 514A is of the first-diffraction order that may be utilized for dark-field illumination. The refracted light beam 514A is incident at the DPM indicia 518 at a second incident angle relative to the imaging axis 501 of the image sensor 111 and causes the dark-field illumination of the DPM indicia 518 in the near-field area.

Similarly, the diffractive optical element 506B receives the collimated light beam 510B on a first surface, which is facing towards the collimating optical element 504B, and splits the collimated light beam 510B into the refracted light beams 512B and 514B. The refracted light beam 512B is of a zero-diffraction order that may be utilized for the bright-field illumination. The refracted light beam 512B is incident at the DPM indicia 518 at the first incident angle relative to the imaging axis 501 of the image sensor 111 and causes the bright-field illumination of the DPM indicia 518 in the far-field area. Further, the refracted light beam 514B is of a first-diffraction order that may be utilized for dark-field illumination. The refracted light beam 514B is incident at the DPM indicia 518 at a second incident angle relative to the imaging axis 501 of the image sensor 111 and causes the dark-field illumination of the DPM indicia 518 in the near-field area.

In this regard, in accordance with the above embodiment described herein, the plurality of diffractive optical elements 506A and 506B, split the received plurality of collimated light beams 510A and 510B. The plurality of collimated light beams 510A and 510B are further received from the plurality of collimating optical elements 504A and 504B. The plurality of refracted light beams (512A, 514A) and (512B, 514B) is directed to travel along the first direction 503, which is parallel to the direction of the imaging axis 501 of the image sensor 111.

In another embodiment, for the dark-field illumination, the refracted light beam 514A of the first-diffraction order may be further split by the diffractive optical element 506A into light beams that constitute the plurality of color components, such as the color components (602A, 604A, and 606A). The plurality of color components (602A, 604A, and 606A) may depend upon the type of the color model utilized for image processing, for example, RGB color model, based on which the refracted light beam 514A is split into a red color component, depicted by 602A, a green color component, depicted by 604A, and a blue color component, depicted by 606A.

Similarly, the refracted light beam 514B of the first-diffraction order may be further split by the diffractive optical element 506B into light beams that constitute the plurality of color components, such as the color components (602B, 604B, and 606B). The plurality of color components (602B, 604B, and 606B) may depend upon the type of the color model utilized for image processing, for example, RGB color model, based on which the refracted light beam 514B is split into a red color component, depicted by 602B, a green color component, depicted by 604B, and a blue color component, depicted by 606B.

In an embodiment, a color incident angle of each color component of the plurality of color components, such as the (602A, 604A, and 606A) and (602B, 604B, and 606B), on the DPM indicia 518 is based on a wavelength of corresponding color component. For example, as illustrated in FIG. 6, the color incident angle of the red color components, depicted by 602A and 602B, of the refracted light beam is maximum because wavelength of red color component is maximum relative to the wavelengths of the green and blue color components. The color incident angle of the blue color component, depicted by 606A and 606B, of the refracted light beam is minimum because wavelength of blue color component is minimum relative to the wavelengths of the red and green color components. Further, the color incident angle of the green color component, depicted by 604A and 604B, of the refracted light beam is intermediate because of wavelength of the green color component is intermediate relative to the wavelengths of the red and blue color components. The characteristics of the plurality of color components (602A, 604A, and 606A) and (602B, 604B, and 606B) in the set of reflected light beams 608A and 608B are based on the distance of the DPM indicia 518 from the image sensor 111 in the indicia reading apparatus 102.

In this regard, in accordance with the embodiments described herein, the plurality of diffractive optical elements 506A and 506B, splits the received plurality of collimated light beams 510A and 510B, received from the plurality of collimating optical elements 504A and 504B, and directs the plurality of color components (602A, 604A, and 606A) and (602B, 604B, and 606B) to travel along the first direction 503, which is parallel to the direction of the imaging axis 501 of the image sensor 111. The control turns to operations 806 and 808 in parallel or at least partially in parallel.

Turning to operation 806, the DPM illumination system 104 may include means, such as a combination of various components described in FIG. 1, for causing the bright-field illumination of the DPM indicia 518. In other words, the operation 806 involves operating the indicia reading apparatus 102 (or the scanning and decoding system 300) in the bright-field illumination mode in the far-field area based on the first set of refracted light beams, such as the first set of refracted light beams 512A and 512B, with the zero-diffraction order. The first set of refracted light beams, such as the refracted light beams 512A and 512B, may be incident at first angles at the DPM indicia 518 relative to the imaging axis 501 of the image sensor 111 in the indicia reading apparatus 102. Control turns to operation 810.

Turning to operation 808, the DPM illumination system 104 may include means, such as a combination of various components described in FIG. 1, for causing the dark-field illumination of the DPM indicia 518. In other words, the operation 808 involves operating the indicia reading apparatus 102 (or the scanning and decoding system 300) in the dark-field illumination mode in the near-field area based on the second set of refracted light beams, such as the second set of refracted light beams 514A and 514B, with the first-diffraction order. The second set of refracted light beams 514A and 514B, may be incident at second angles at the DPM indicia 518 relative to the imaging axis 501 of the image sensor 111 in the indicia reading apparatus 102. Per the embodiments described herein, the second angles incident at the DPM indicia 518 relative to the imaging axis 501 of the image sensor 111 in the indicia reading apparatus 102 are less than the first angles incident at the DPM indicia 518 relative to the imaging axis 501 of the image sensor 111 in the indicia reading apparatus 102. Effectively, the high-angle first set of refracted beams 512A and 512B strikes the surface that includes the DPM indicia 518 nearly perpendicularly, or at an angle not greater than 45 degrees from perpendicular of the DPM indicia 518. And the low-angle second set of refracted beams 514A and 514B strikes the surface that includes the DPM indicia 518 nearly perpendicularly, or at angle between 45 degrees and 90 degrees from perpendicular of the DPM indicia 518.

Turning to operation 810, the DPM illumination system 104 may include means, such as the image sensor 111, for generating image data of the DPM indicia 518. The image sensor 111 may generate the image data of the DPM indicia 518 based on reflected light beams, depicted by (516A, 516B) or (608A, 608B), received from the DPM indicia 518 and travelling towards the image sensor 111 in the image sensor 111 in the second direction 505. The reflected light beams, depicted by (516A, 516B) or (608A, 608B), are a consequence of striking of the refracted light beams, depicted by (512A, 514A), (512B, 514B), (602A, 604A, 606A) or (602B, 604B, 606B) and travelling in the first direction 503, at the DPM indicia 518.

In an example embodiment when the control turns to the operation 810 from the operation 806, the image sensor 111 may generate first image data of the DPM indicia 518 based on the plurality of reflected light beams 516A and 516B received from the DPM indicia 518 in accordance with the bright-field illumination performed on the DPM indicia 518. In such a case, the plurality of reflected light beams 516A and 516B includes substantially most of the light components of the first set of refracted light beams 512A and 512B. In such embodiment, the generated first image data of the DPM indicia 518 may correspond to monochrome data when the image sensor 111 includes monochrome sensors.

In another example embodiment when the control turns to the operation 810 from the operation 806, the image sensor 111 may generate the first image data of the DPM indicia 518 based on the plurality of reflected light beams 516A and 516B received from the DPM indicia 518 in accordance with the dark-field illumination performed on the DPM indicia 518. In such case, the plurality of reflected light beams 516A and 516B include substantially most of the light components of the second set of refracted light beams 514A and 514B. In such an embodiment, the generated first image data of the DPM indicia 518 may correspond to monochrome data when the image sensor 111 includes monochrome sensors. FIG. 5

In yet another example embodiment when the control turns to the operation 810 from the operation 808, the image sensor 111 may generate a binary image data or a second image data of the DPM indicia 518 based on the reflected light beams 608A and 608B received from the DPM indicia 518 in accordance with the dark-field illumination performed on the DPM indicia 518. In such case, the plurality of reflected light beams 516A and 516B include substantially most of the light components of the plurality of color components (602A, 604A, 606A) and (602B, 604B, 606B). In such embodiment, the generated second image data of the DPM indicia 518 may correspond to color data when the image sensor 111 includes color sensors. In another embodiment, the generated binary image data of the DPM indicia 518 may correspond to a black and white data when the image sensor 111 includes color sensors. FIG. 6 illustrates the example embodiment in detail.

Turning to operation 812, the DPM illumination system 104 may include means, such as the image processing module 114, for reconstructing one of a first image, a binary image, or a second image based on the generated first image data, binary image data, or second image data, and a type of the image sensor 111. In an embodiment, for the reconstruction of the first image, the control turns to operation 902 in FIG. 9. In another embodiment, for the reconstruction of the binary image or the second image, the control turns to operation 1002 in FIG. 10.

Turning to operation 902 in FIG. 9, the DPM illumination system 104 may include means, such as the image sensor 111, for receiving the plurality of reflected light beams 516A and 516B from the DPM indicia 518. The plurality of reflected light beams 516A and 516B corresponds to at least the second set of refracted light beams 514A and 514B. The plurality of reflected light beams 516A and 516B from the DPM indicia 518 travels parallel to the imaging axis 501 in the second direction 505. The plurality of reflected light beams 516A and 516B is projected onto the image sensor 111 that includes monochrome sensors.

While receiving the plurality of reflected light beams 516A and 516B from the DPM indicia 518, the exposure process of the pixels starts. Each pixel in the image sensor 111 gets uncovered to collect incoming light beams, i.e. the plurality of reflected light beams 516A and 516B. When the exposure process ends, each pixel is read as an electronic signal which is further quantified, processed and stored as numerical binary value as the image data in an image file. The pixel of the monochrome sensors capture all incoming light beams, i.e. the plurality of reflected light beams 516A and 516B, at each pixel regardless of color. Thus, the generated data comprise image data values recorded at each pixel effectively. Each pixel, therefore, receives up to three times more light or three times more exposure to an image, since all the three-color components in the RGB model, i.e. red, green and blue, are all absorbed. Thus, 1.5 times more details and light sensitivity are transformed as compared to color sensors.

Turning to operation 904, the DPM illumination system 104 may include means, such as the image processing module 114, for generating a first image based on the generated image data and the type of the image sensor 111, i.e. the monochrome sensor. The image data values recorded at each pixel effectively just become the values at each pixel of the first image, due to which the first image does not require demosaicing. Demosaicing is a process in which values from pixels are intelligently combined to produce full color pixels. The resolution and image quality of the first image, thus generated by the monochrome sensors, are higher as compared to the second image generated by color sensors, as described in FIG. 10. Control returns to operation 814 of FIG. 8.

Turning to operation 1002 in FIG. 10, in an embodiment pertaining to the reconstruction of the binary image or the second image, the DPM illumination system 104 may include means, such as the image sensor 111, for receiving a portion of the set of reflected light beams 608A and 608B from the DPM indicia 518, as illustrated in FIG. 6. The set of reflected light beams 608A and 608B includes a plurality of color components and corresponds to a plurality of refracted light beams, such as the second set of refracted light beams 514A and 514B, with at least one of the zero-diffraction order and the first-diffraction order.

The reflected light beams 608A and 608B from the DPM indicia 518 travel parallel to the imaging axis 501 in the second direction 505. The reflected light beams 608A and 608B are projected onto the image sensor 111 that includes color sensors. In an example embodiment, Bayer Filter is implemented to transform a monochrome sensor to a color sensor or an RGB sensor. The Bayer Filter that uses a color filter array (CFA), which captures alternating red, green and blue colors at each pixel in such a manner that twice as many green pixels are recorded as either of the other two colors, i.e. red and blue. While receiving the plurality of reflected light beams 516A and 516B from the DPM indicia 518, the exposure process of the pixels starts. Each pixel in the image sensor 111 gets uncovered to collect incoming light beams, i.e. the reflected light beams 608A and 608B. When the exposure process ends, each pixel is read as an electronic signal which is further quantified, processed and stored as numerical value as the image data in an image file. In such embodiment, the pixels of the color sensors capture approximately one-third of incoming light beams, i.e. the reflected light beams 608A and 608B, at each pixel. Each pixel, therefore, receives only one-third of the light or one-third of less exposure to an image, since one of the three-color components in the RGB model, i.e. red, green and blue, is absorbed by a pixel. In other words, any color not matching the pattern is filtered out. For example, any red or blue light that hits a green pixel won't be recorded.

Turning to operation 1004, the DPM illumination system 104 may include means, such as the image processing module 114, for determining whether one or more characteristics of the set of reflected light beams 608A and 608B satisfy first threshold values. Various examples of the one or more characteristics of the set of reflected light beams 608A and 608B may include, but are not limited to the intensity of the reflected light beams 608A and 608B, color of the reflected light beams 608A and 608B, an area of coverage of pixels by the reflected light beams 608A and 608B.

If, in an example embodiment, the intensity of the reflected light beams 608A and 608B is less than a threshold intensity, color of the reflected light beams 608A and 608B is less than a threshold color, or an area of coverage of pixels by the reflected light beams 608A and 608B is less than a threshold area then, the control turns to operation 1006. If, in another example embodiment, the intensity of the reflected light beams 608A and 608B exceeds the threshold intensity, the color of the reflected light beams 608A and 608B exceeds the threshold color, or the area of coverage of pixels by the reflected light beams 608A and 608B exceeds the threshold area, then the control turns to operation 1008.

Turning to operation 1006, the DPM illumination system 104 may include means, such as the image processing module 114, for resetting a pixel value to a specific value for the reconstruction of the binary image based on defined criteria. In an embodiment, the defined criteria may correspond to a comparison of an average pixel value with a threshold value. For each pixel, if corresponding pixel value is less than the threshold value, the corresponding pixel value is reset to zero, and if corresponding pixel value is greater than the threshold value, the corresponding pixel value is reset to 1. Thus, the image processing module 114 generates the binary image as a black and white image. The control returns to operation 814 in FIG. 8.

Turning to operation 1008, the DPM illumination system 104 may include means, such as the image processing module 114, for generating separate color plane images based on received reflected light beams 608A and 608B. In an embodiment, the image processing module 114 may be configured to generate such separate color plane images, such as red image, green image, and blue plane image. Each pixel in the color sensor is represented by combination of the three-color components. Each of the three layers represents the intensity of red, green, and blue in the array of pixels. The image processing module 114 may be configured to generate a color plane image, such as red plane image, based on programmatically resetting two of the color components, i.e. green and blue color components, to null. Similarly, the image processing module 114 may be configured to generate a green plane image, based on programmatically resetting red and blue color components to null. Similarly, the image processing module 114 may be configured to generate a blue plane image, based on programmatically resetting red and green color components to null.

Turning to operation 1010, the DPM illumination system 104 may include means, such as the image processing module 114, for determining whether one or more characteristics of the generated color plane images satisfy second threshold value. Examples of the one or more characteristics may include, but are not limited to, hue, saturation, contrast, brightness, and sharpness. In an embodiment, the image processing module 114 may compare the one or more characteristics, for example the contrast values, of the generated red, green, and blue plane images, with threshold contrast value. In an example embodiment, the image processing module 114 may determine that the one or more characteristics of the generated color plane images satisfy second threshold values. In such a case, the control turns to operation 1012. In another example embodiment, the image processing module 114 may determine that the one or more characteristics of the generated color plane images do not satisfy the second threshold values. In such a case, the control turns to operation 1014.

Turning to operation 1012, when it is determined that the one or more characteristics of the generated color plane images satisfy the second threshold value, the DPM illumination system 104 may include means, such as the image processing module 114, for determining a color plane image amongst the plurality of color plane images, the characteristics of which exceeds the second threshold value. In an embodiment, for example, the image processing module 114, may determine that the red color plane image amongst the plurality of color plane images have the characteristics, such as contrast value, that exceeds the threshold contrast value.

In various embodiments, the characteristics of the generated color plane images may be based on the distance of the DPM indicia 518 from the image sensor 111 (that includes the color sensors). In an example embodiment, at the second distance "D2", as illustrated in FIG. 6, the characteristics of the green plane image may be the highest. In another example embodiment, at the third distance "D3", the characteristics of the red plane image may be the highest. In yet another example embodiment, at the fourth distance "D4", the characteristics of the blue plane image may be the highest.

In other example embodiments, the image processing module 114 may determine more than one color plane image amongst the plurality of color plane images, the characteristics of which exceed the second threshold value. For example, at an intermediate distance, such as the distance points between "D3" and "D2", the characteristics of a combination of red and green color plane images may be the highest. Or at another intermediate distance, such as the distance points between "D2" and "D4", the characteristics of a combination of green and blue color plane images may be the highest.

Turning to operation 1016, the DPM illumination system 104 may include means, such as the image processing module 114, for selecting the color plane image, which is determined at operation 1012, with the highest characteristics, as the second image. In an example embodiment, the image processing module 114 may select, for example, the green color plane when the DPM indicia 518 is at the second distance "D2" from the image sensor 111, as illustrated in FIG. 6, as the characteristics, for example the contrast level, of the green plane image is the highest amongst all the color plane images, such as the red color image and the blue color image. In another example embodiment, the image processing module 114 may select, for example, the red color plane when the DPM indicia 518 is at the third distance "D3" from the image sensor 111, as illustrated in FIG. 6, as the characteristics, for example the contrast level, of the red plane image is the highest amongst all the color plane images, such as the green color image and the blue color image. In yet another example embodiment, the image processing module 114 may select, for example, the blue color plane when the DPM indicia 518 is at the fourth distance "D4" from the image sensor 111, as illustrated in FIG. 6, as the characteristics, for example the contrast level, of the green plane image is the highest amongst all the color plane images, such as the red color image and the green color image.

As discussed above (at operation 1012), in certain embodiments, the image processing module 114 may determine more than one color plane image amongst the plurality of color plane images, the characteristics of which exceed the second threshold value. In such embodiments, at operation 1016, the image processing module 114 may select a combination of more than one color plane images, which are determined (at operation 1012), with the highest characteristics, as the second image. In an example embodiment, the image processing module 114 may select, for example, a combination of the green color plane and the red color plane when the DPM indicia 518 is at a distance which is between the second distance "D2" and the third distance "D3" from the image sensor 111, as the characteristics, for example the contrast levels, of the red and green plane images are the highest. Following operation 1016, control turns to operation 1020.

Turning to operation 1014, when it is determined that the one or more characteristics of the generated color plane images do not satisfy the second threshold values, the DPM illumination system 104 may include means, such as the image processing module 114, for determining color of each pixel as image data, based on a combination of the plurality of color components (602A, 604A, and 606A) and (602B, 604B, and 606B) that are included in the set of reflected light beams 608A and 608B. In an example embodiment, the second image data may include color components that contribute to the final image of the DPM indicia 518. However, in such embodiment, the second image data may further include color components that may not contribute to the final image of the DPM indicia 518.

Turning to operation 1018, the DPM illumination system 104 may include means, such as the image processing module 114, for generating the second image based on the generated second image data. In an embodiment, the second image thus generated may include a first image portion and a plurality of second portions. For example, as illustrated in FIG. 7A, the second image 702A may include the first portion, depicted by 704, and the plurality of second portions, depicted by 706A-706D. The first portion, depicted by 704, corresponds to an image that is reconstructed based on one or more color components, such as red color components 602A and 602B, and green color components 604A and 604B, when the DPM indicia is positioned between the second distance "D2" and the third distance "D3" relative to the indicia reading apparatus 102. However, there are also, for example the blue color components 606A and 606B, which does not contribute to the reconstruction of the second image 702A, but appear as noise color components or specular reflection in, for example, the plurality of second portions, depicted by 706A-706D.

Figure 7B:
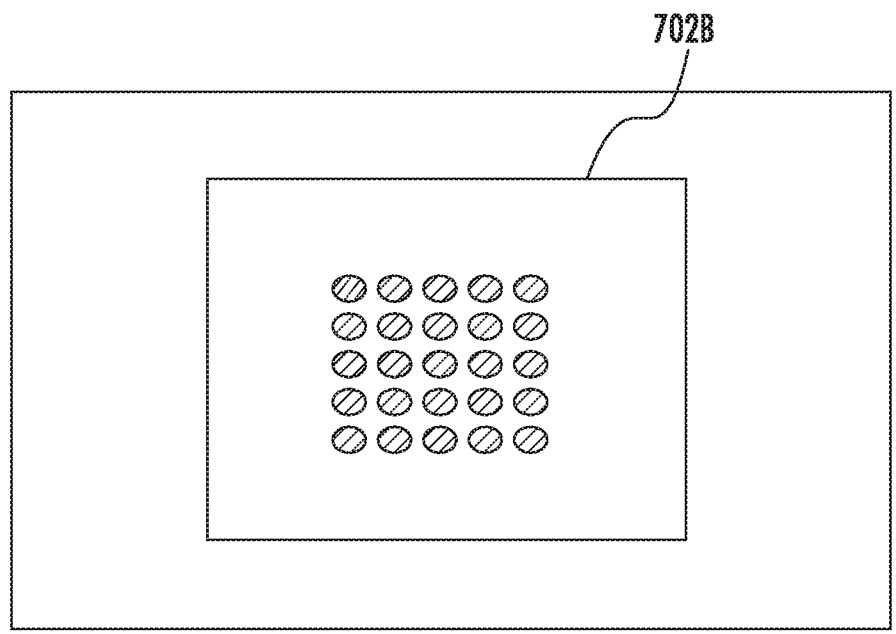

Turning to operation 1020, the DPM illumination system 104 may include means, such as the image processing module 114, for removing noise color component from the generated second image. In an example embodiment, as illustrated in FIG. 7A, the blue color components 606A and 606B, does not contribute to the reconstruction of the second image 702A, but appear as noise color components or specular reflection in, for example, the plurality of second portions, depicted by 706A-706D. In such embodiment, the image processing module 114 may be configured to remove such noise color components appearing in, for example, the plurality of second portions, depicted by 706A-706D, from the reconstructed second image, based on one or more image processing techniques. Consequently, the image processing module 114 may be configured to filter the second image 702A and generate a final second image 702B, as illustrated in FIG. 7B, which do not include the noise color components appearing in, for example, the plurality of second portions, depicted by 706A-706D. Thus, the final second image 702B only includes the first portion, depicted by 704, that corresponds to an image that is reconstructed based on color components, such as red color components 602A and 602B, and green color components 604A and 604B. The control returns to operation 814.

Turning to operation 814, the DPM illumination system 104 may include means, such as the decoder module 172, for decoding the reconstructed first image, the binary image, or the second image, received from the monochrome sensors or the color sensors, respectively, in the image sensor 111. In an embodiment, the decoder module 172 may decode the reconstructed first image when the contrast level of the reconstructed first image exceeds a threshold contrast level. In another embodiment, the decoder module 172 may decode the reconstructed binary image when the contrast level of the reconstructed binary image exceeds a threshold contrast level. In an embodiment, the decoder module 172 may decode the reconstructed second image, such as the second image 702B, when the contrast level of the reconstructed second image, i.e. the second image 702B, exceeds a threshold contrast level.

The decoding of the reconstructed first image, binary image, or the second image involves performance of various related steps, the particulars of which are determined by the parameters of a parameter table associated with the indicia reading apparatus 102 and a decoding algorithm. The parameter table, which is preferably stored in EPROM 130, may specify the values of parameters that define the mode in which the indicia reading apparatus 102 will operate. Examples of such parameters may include, but are not limited to, the size and the frame rate of the image sensor 111, the codes that will be enabled during auto discrimination, I/O communication protocols, beeper pitch or volume, and the like. The default values of such parameters may be used if the user or an externally generated programming command does not specify other values, and correspond to a combination of parameters which are suitable for use under most operating conditions.

Included among such steps are a scanning subroutine which specifies the address space or spaces in which scan data will be stored and whether scanning is to be continuous (e.g., at a full video rate, such as 30 frames per second), or discontinuous (e.g., with pauses related to the current state of the trigger). The operation of the decoding routine, which is executed in a user or factory selectable relationship to the scanning routine, may be governed by parameters which control the codes which are enabled for processing as a part of the auto discrimination process, whether decoding is to be continuous or discontinuous, etc. As will be explained more fully later, permitted combinations of scanning and decoding parameters together define the scanning decoding relationships or modes which the indicia reading apparatus 102 may use.

Turning to operation 816, the DPM illumination system 104 may include means, such as the image processing module 114 and/or the decoder module 172, for determining whether the decoding of the first, the binary, and or the second image of the DPM indicia 518 is successful. In an embodiment, when the decoding of the first, the binary, or the second image of the DPM indicia 518 is successful, the control turns to operation 818. In another embodiment, when the decoding of the first, the binary, and or the second image of the DPM indicia 518 is not successful, the control turns to operations 806 and 808.

Turning to operation 818, the DPM illumination system 104 may include means, such as the image processing module 114 and/or the decoder module 172, for causing the reconstructed first image, the binary image or the second image (such as the second image 702B), to be displayed on a display screen. In an example, the display screen corresponds to the display 156 included in the indicia reading apparatus 102, as illustrated in FIG. 1. In another example, the display screen corresponds to the displays 206B and 206C incorporated in the respective housings 200B and 200C of the indicia reading apparatus 102, as illustrated in respective FIGS. 2F and 2G. In yet another example, the display screen corresponds to the display 410 equipped with the host processor 402, as illustrated in FIG. 4.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. An indicia reading system comprising:
a plurality of collimating optical elements positioned at a plurality of locations on a boundary frame that surrounds an objective lens of the indicia reading system, wherein each of the plurality of collimating optical elements is configured to generate a collimated light beam;
a plurality of diffractive optical elements coupled with the plurality of collimating optical elements, wherein each of the plurality of diffractive optical elements is tuned to split a corresponding collimated light beam into at least two sets of refracted light beams at two incident angles relative to a direct part marker (DPM) indicia, in accordance with two diffraction orders,
wherein a first set of refracted light beams with a zero-diffraction order and a first incident angle causes a bright-field illumination in a far-field area, and
wherein a second set of refracted light beams with a first-diffraction order and a second incident angle causes a dark-field illumination in a near-field area;
an image sensor configured to generate image data of the DPM indicia based on a set of reflected light beams received from the DPM indicia in accordance with one of the bright-field illumination or the dark-field illumination performed on the DPM indicia; and
an image processing module configured to reconstruct a second image based on the generated image data in an instance in which the image sensor is a color sensor.

2. The indicia reading system according to claim 1, further comprising an image processing module that is coupled to the image sensor and is configured to reconstruct a first image based on the generated image data in an instance in which the image sensor is a monochrome sensor.

3. The indicia reading system according to claim 2, wherein the monochrome sensor is configured to receive the set of reflected light beams from the DPM indicia, wherein the set of reflected light beams corresponds to one of the at least two sets of refracted light beams.

4. The indicia reading system according to claim 2, wherein a decoder module is further configured to decode the reconstructed first image when a contrast level of the reconstructed first image exceeds a threshold contrast level.

5. The indicia reading system according to claim 1, wherein the color sensor is configured to receive a portion of the set of reflected light beams from the DPM indicia, wherein the set of reflected light beams comprises a plurality of color components and corresponds to one of the at least two sets of refracted light beams.

6. The indicia reading system according to claim 1, wherein each of the at least two sets of refracted light beams comprise a plurality of color components, wherein a color incident angle of each color component of the plurality of color components in each of the at least two refracted light beams on the DPM indicia is based on a wavelength of corresponding color component.

7. The indicia reading system according to claim 1, wherein the image processing module is further configured to reconstruct a binary image based on the generated image data in an instance in which the image sensor is the color sensor by resetting a pixel value to a specific value for the reconstruction of the binary image based on a defined criteria when one or more characteristics of the set of reflected light beams do not satisfy first threshold values, wherein the reconstructed binary image is a black and white image.

8. The indicia reading system according to claim 7, wherein the defined criteria correspond to a comparison of an average pixel value with a threshold value, wherein for each pixel, if corresponding pixel value is less than the threshold value, the corresponding pixel value is reset to zero, and if corresponding pixel value is greater than the threshold value, the corresponding pixel value is reset to 1.

9. The indicia reading system according to claim 1, wherein the image processing module is further configured to generate a plurality of color planes when one or more characteristics of the set of reflected light beams satisfy first threshold values.

10. The indicia reading system according to claim 9, wherein the image processing module is further configured to select a color plane from the plurality of color planes for the reconstruction of the second image based on a distance between the image sensor and the DPM indicia when one or more characteristics of the plurality of color planes satisfy second threshold values, wherein one or more characteristics of the selected color plane is the highest relative to one or more characteristics of other color planes.

11. The indicia reading system according to claim 1, wherein the image processing module is further configured to determine a color of each pixel based on a combination of plurality of color components for the reconstruction of the second image when one or more characteristics of a plurality of color planes do not satisfy second threshold values.

12. The indicia reading system according to claim 11, wherein a decoder module is configured to decode the reconstructed second image when a contrast level of the reconstructed second image exceeds a threshold contrast level.

13. The indicia reading system according to claim 11, wherein the image processing module is further configured to cause the reconstructed second image to be displayed on a display screen in an instance when the decoding of the reconstructed second image is successful.

14. The indicia reading system according to claim 1, wherein the image processing module is further configured to remove noise color component from the reconstructed second image.

15. The indicia reading system according to claim 1, further comprising a plurality of diffuser elements coupled with the plurality of diffractive optical elements, wherein each diffuser element is configured to scatter each of the at least two sets of refracted light beams received from corresponding diffractive optical elements at defined angles.

16. The indicia reading system according to claim 15, wherein the image processing module is further configured to control the plurality of diffuser elements coupled with the plurality of diffractive optical elements based on a readability index of the DPM indicia from a first image or the second image reconstructed by the image processing module.

17. The indicia reading system according to claim 1, wherein each of the plurality of diffractive optical elements corresponds to a transmissive diffraction grating element, wherein the indicia reading system is a direct part marker (DPM) indicia reading system.

18. A method for reading indicia, the method comprising:
generating, by a plurality of collimating optical elements, collimated light beams based on light beams received from a plurality of light sources at different wavelengths;
splitting, by a diffractive optical element of a plurality of diffractive optical elements, a collimated light beam generated by one of the plurality of collimating optical elements into at least two sets of refracted light beams at two incident angles relative to a DPM indicia, in accordance with two diffraction orders;
operating, by a DPM illumination system, an indicia reading system in a bright-field illumination mode in a far-field area based on a first set of refracted light beams with a zero-diffraction order and a first incident angle relative to the DPM indicia;
operating, by the DPM illumination system, the indicia reading system in a dark-field illumination mode in a near-field area based on a second set of refracted light beams with a first-diffraction order and a second incident angle relative to the DPM indicia;
generating, by an image sensor, image data of the DPM indicia based on a set of reflected light beams received from the DPM indicia in accordance with the operation of the indicia reading system in the bright-field illumination mode and/or the dark-field illumination mode; and
reconstructing, by an image processing module coupled to the image sensor, a second image based on the generated image data in an instance in which the image sensor is a color sensor.

19. The method according to claim 18, further comprising reconstructing, by an image processing module, one of a first image, a binary image, or the second image based on the generated image data and a type of the image sensor, wherein the type of the image sensor corresponds to a monochrome sensor or the color sensor.

20. The method according to claim 18, further comprising reconstructing, by the image processing module, a binary image based on the generated image data in an instance in which the image sensor is the color sensor by resetting a pixel value to a specific value for the reconstruction of the binary image based on a defined criteria when one or more characteristics of the set of reflected light beams do not satisfy first threshold values, wherein the reconstructed binary image is a black and white image.

* * * * *